United States Patent
Gobara et al.

(10) Patent No.: US 7,873,037 B2
(45) Date of Patent: Jan. 18, 2011

(54) INFORMATION PROCESSING DEVICE, INFORMATION PROCESSING SYSTEM, INFORMATION PROCESSING METHOD, AND PROGRAM

(75) Inventors: Kunio Gobara, Osaka (JP); Hajime Maekawa, Osaka (JP)

(73) Assignee: Panasonic Corporation, Osaka (JP)

( * ) Notice: Subject to any disclaimer, the term of this patent is extended or adjusted under 35 U.S.C. 154(b) by 548 days.

(21) Appl. No.: 11/718,545

(22) PCT Filed: Oct. 31, 2005

(86) PCT No.: PCT/JP2005/019975

§ 371 (c)(1),
(2), (4) Date: May 3, 2007

(87) PCT Pub. No.: WO2006/049117

PCT Pub. Date: May 11, 2006

(65) Prior Publication Data

US 2008/0123646 A1    May 29, 2008

(30) Foreign Application Priority Data

Nov. 5, 2004  (JP) .............................. 2004-321659

(51) Int. Cl.
*G06F 15/16* (2006.01)
*H04L 12/28* (2006.01)
*H04L 12/56* (2006.01)
(52) U.S. Cl. ..................... 370/389; 370/390; 709/227
(58) Field of Classification Search .............. 370/390, 370/389; 709/227
See application file for complete search history.

(56) References Cited

U.S. PATENT DOCUMENTS 6,907,406 B2 *  6/2005  Suzuki ..................... 705/52

(Continued)

FOREIGN PATENT DOCUMENTS

JP    2002-141953    5/2002

(Continued)

OTHER PUBLICATIONS

International Search Report (PCT/JP2005/019975) dated Feb. 7, 2006.

*Primary Examiner*—Salman Ahmed
*Assistant Examiner*—Tarell Hampton
(74) *Attorney, Agent, or Firm*—Pearne & Gordon LLP

(57) ABSTRACT

An information processing apparatus, an information processing system, an information processing method, and a program for enabling an information processing apparatus to receive a packet transmitted from a server and making it possible to prevent an increase in the traffic of a communication line of the Internet, etc., are disclosed. The information processing apparatus includes a repetitive packet transmission section for transmitting a repetitive packet, a function determination section for determining whether or not the nearest communication processing apparatus has a port mapping setting function, a port mapping setting section for setting port mapping for the nearest communication processing apparatus if it is determined that the nearest communication processing apparatus has a port mapping setting function, and a transmission control section for controlling the repetitive packet transmission section so as to transmit the repetitive packet if it is not determined that the nearest communication processing apparatus has a port mapping setting function.

16 Claims, 13 Drawing Sheets

U.S. PATENT DOCUMENTS

| | | |
|---|---|---|
| 7,058,054 B2 * | 6/2006 | Abdollahi et al. ........... 370/392 |
| 7,505,447 B2 * | 3/2009 | Kish et al. .................. 370/349 |
| 2003/0054794 A1 * | 3/2003 | Zhang ....................... 455/403 |
| 2003/0099202 A1 * | 5/2003 | Lear et al. .................. 370/238 |
| 2004/0264381 A1 * | 12/2004 | Banerjee et al. ............ 370/252 |
| 2005/0041596 A1 * | 2/2005 | Yokomitsu et al. .......... 370/252 |
| 2005/0111389 A1 * | 5/2005 | Dick et al. ................. 370/278 |
| 2006/0045098 A1 * | 3/2006 | Krause ....................... 370/396 |
| 2007/0083655 A1 * | 4/2007 | Pedersen .................... 709/226 |

FOREIGN PATENT DOCUMENTS

| | | |
|---|---|---|
| WO | 2004-030292 | 4/2004 |
| WO | 2004/095807 | 11/2004 |

* cited by examiner

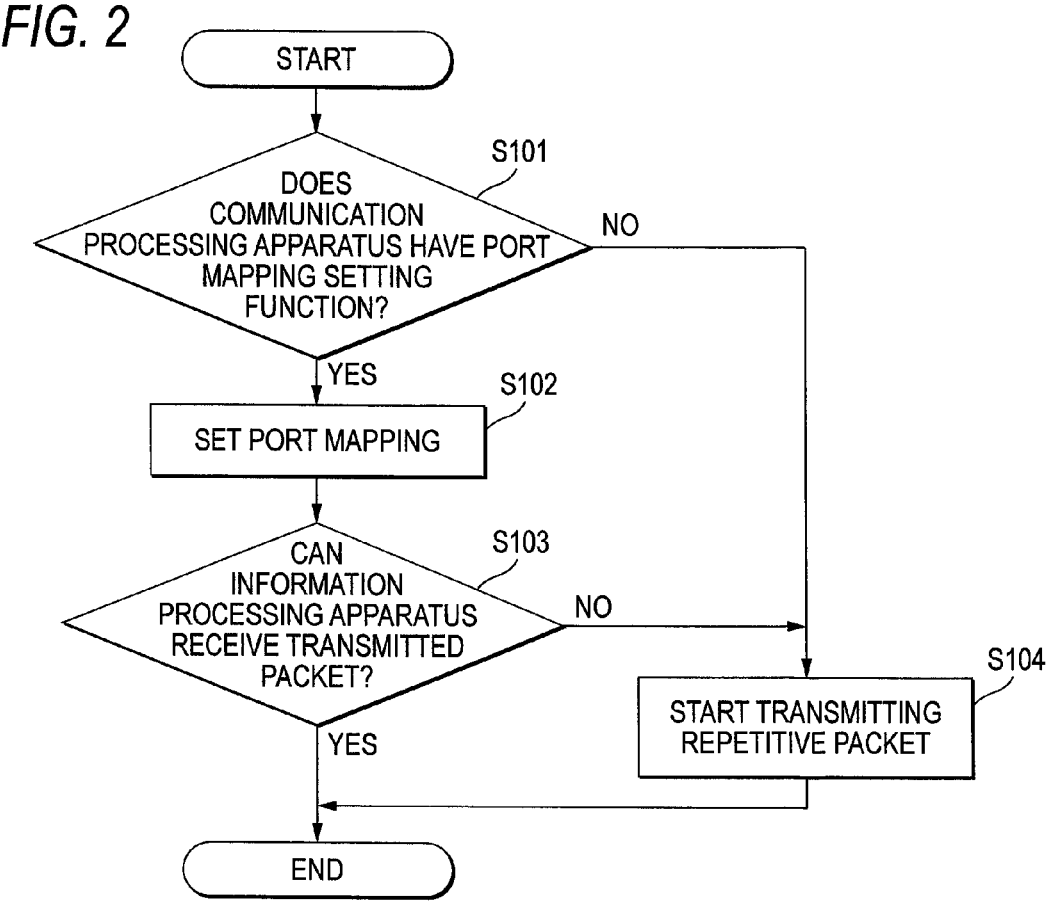
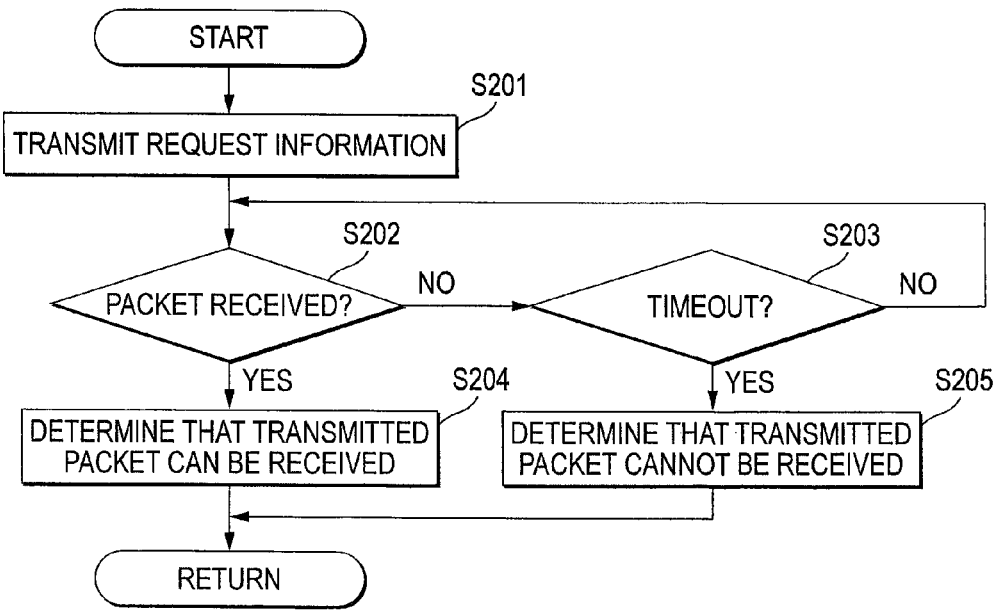

FIG. 4
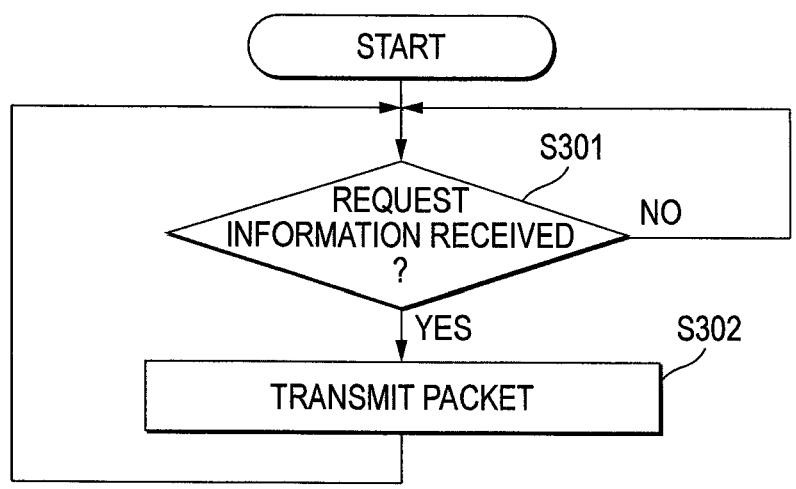
FIG. 5
| LAN SIDE | | WAN SIDE |
|---|---|---|
| IP ADDRESS | PORT NUMBER | PORT NUMBER |
| 192.168.1.10 | 23456 | 25000 |
| ⋮ | ⋮ | ⋮ |
FIG. 6
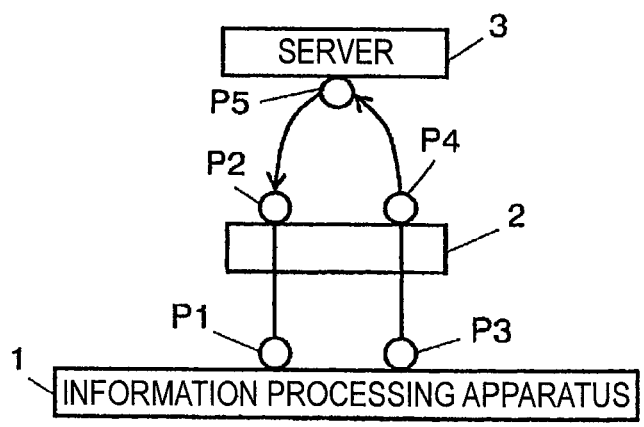

| | | | | |
|---|---|---|---|---|
| 1 | 2ms | 1ms | 1ms | 192.168.1.1 |
| 2 | 4ms | 4ms | 4ms | 155.32.10.1 |
| 3 | 6ms | 6ms | 6ms | 155.32.11.1 |
| 4 | 8ms | 9ms | 7ms | 155.32.12.1 |
| 5 | 8ms | 7ms | 7ms | 155.32.13.1 |
| ⋮ | ⋮ | ⋮ | ⋮ | ⋮ |
| 14 | 8ms | 8ms | 9ms | 155.32.17.1 |
| 15 | 8ms | 8ms | 8ms | 155.32.18.1 |
| 16 | 9ms | 9ms | 8ms | 155.32.19.1 |

PACKET REPLY TIME     RELAY NODE ADDRESS

FIG. 15

| | | | | |
|---|---|---|---|---|
| 1 | 2ms | 1ms | 1ms | 192.168.1.1 |
| 2 | 2ms | 2ms | 1ms | 192.168.2.100 |
| 3 | 4ms | 4ms | 4ms | 155.32.10.1 |
| 4 | 6ms | 6ms | 6ms | 155.32.11.1 |
| 5 | 8ms | 9ms | 7ms | 155.32.12.1 |
| ⋮ | ⋮ | ⋮ | ⋮ | ⋮ |
| 15 | 8ms | 8ms | 9ms | 155.32.17.1 |
| 16 | 8ms | 8ms | 8ms | 155.32.18.1 |
| 17 | 9ms | 9ms | 8ms | 155.32.19.1 |

PACKET         RELAY
      REPLY TIME   NODE ADDRESS

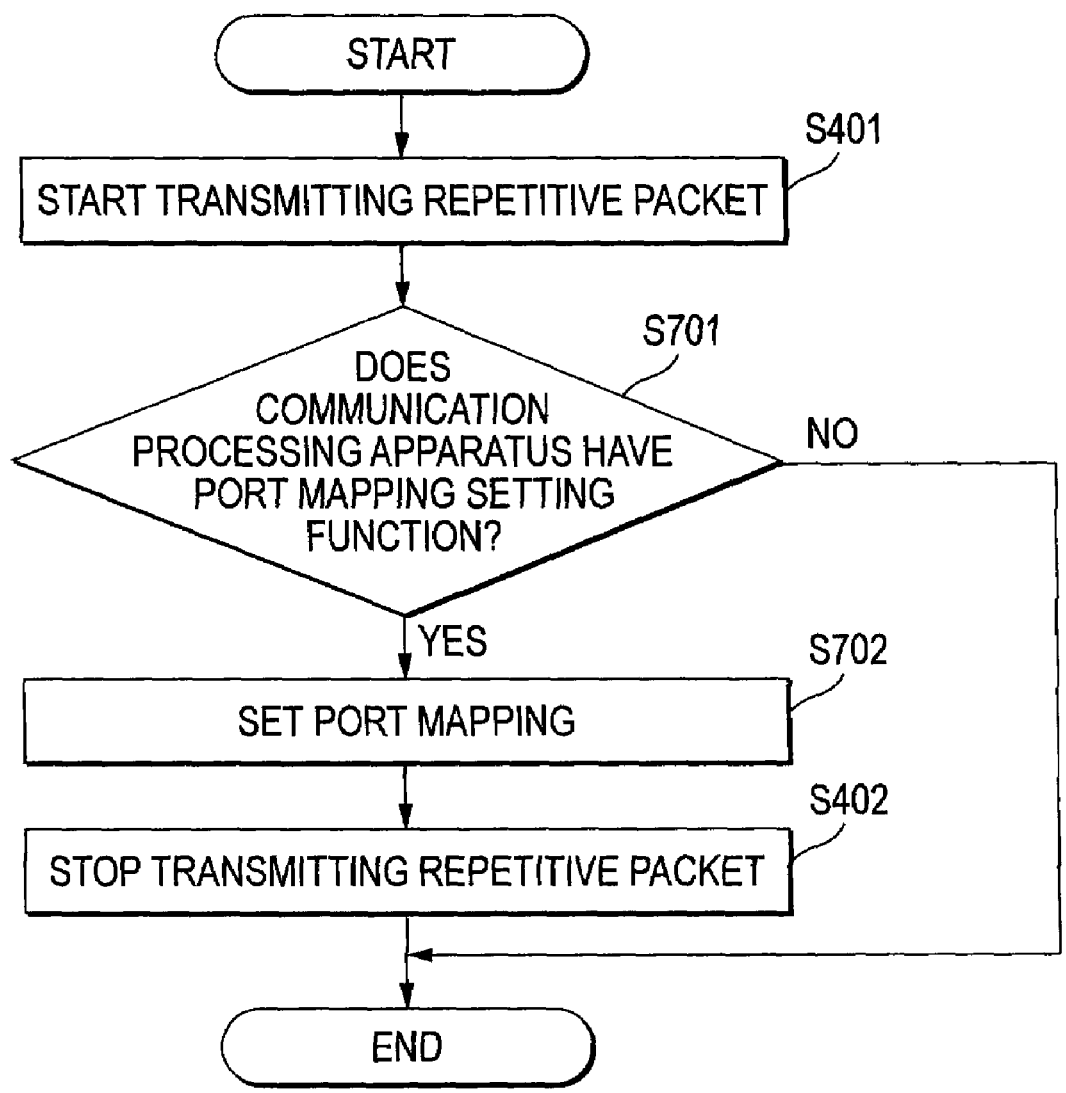

INFORMATION PROCESSING DEVICE, INFORMATION PROCESSING SYSTEM, INFORMATION PROCESSING METHOD, AND PROGRAM

TECHNICAL FIELD

This invention relates to an information processing system wherein an information processing apparatus and other apparatus communicate with each other and the like.

BACKGROUND ART

In an information processing system including an information processing apparatus, a communication processing apparatus, and a server, for example, an information processing apparatus such as a home personal computer (PC) or a home electrical appliance may be accessed through the server from an external apparatus such as a mobile telephone. The communication processing apparatus is a router having a network address translation (NAT) function or the like, for example.

The communication processing apparatus can executes address translation of a packet transmitted from the side of a local area network (LAN) of the communication processing apparatus can relay the packet to the side of a wide area network (WAN). On the other hand, address translation is not necessarily executed for all packets transmitted from the WAN side of the communication processing apparatus for relaying to the LAN side. Therefore, it is necessary to enable the communication processing apparatus to relay a packet transmitted from the server to the information processing apparatus.

As one method for enabling the communication processing apparatus to relay a packet transmitted from the server, a method of setting port mapping in the communication processing apparatus using universal plug and play (UPnP), etc., is available. The port mapping setting is setting to relay a packet transmitted from the WAN side (server side) to a predetermined port of the communication processing apparatus to a predetermined port of the information processing apparatus. The port mapping setting is made, whereby the packet transmitted from the server to the predetermined port of the communication processing apparatus is relayed to the predetermined port of the information processing apparatus.

As another method for enabling the communication processing apparatus to relay a packet transmitted from the server, a method of repeatedly transmitting the packet to the server from the information processing apparatus through the communication processing apparatus is available. This configuration is disclosed in International Patent Laid-Open No. WO2004/030292, for example. When a packet is transmitted from the LAN side to the WAN side, the communication processing apparatus having the NAT function such as a router converts the private Internet protocol (IP) address and port number on the LAN side are translated into the global IP address and port number on the WAN side.

When a packet from the WAN side is received, the packet is filtered according to a predetermined reception filter rule and inverse translation of address translation is executed, whereby the packet is passed to the information processing apparatus. The reception filter rule for determining the reception possibility of the packet from the WAN side relative to the port to which the packet is transmitted from the LAN side of NAT includes an Address Sensitive filter for receiving the packet only from the packet transmission address from the port, a Port Sensitive filter for receiving the packet only from the packet transmission port from the port, and a No filter meaning that no filter exists.

The time for executing such address translation is set in the communication processing apparatus. Specifically, address translation of a packet received from the WAN side is not executed after the expiration of a predetermined time period since the last address translation between the WAN side and the LAN side (new address translation is executed for a packet received from the LAN side). That is, the packet from the WAN side is not received at the information processing apparatus and the information processing apparatus cannot be accessed via the server from an external apparatus such as a mobile telephone. The predetermined time period will be called the port maintaining time.

Therefore, a packet is repeatedly transmitted to maintain the port of the communication processing apparatus (namely, to allow the packet from the WAN side to be transmitted via the communication processing apparatus to the information processing apparatus), whereby it is made possible to access the information processing apparatus via the server from an external apparatus such as a mobile telephone. Therefore, if port mapping is set in the communication processing apparatus using UPnP, etc., it is not necessary to repeatedly transmit a packet to the server.

However, port mapping cannot necessarily be set in all communication processing apparatus using UPnP, etc. Some communication processing apparatus are not compatible with the standard of UPnP, etc., and port mapping cannot be set in the communication processing apparatus. On the other hand, an increase in the traffic of communication lines of the Internet, etc., can result from enabling the information processing apparatus to receive the packet transmitted from the server by repeatedly transmitting a packet without setting port mapping relative to all communication processing apparatus.

DISCLOSURE OF THE INVENTION

The invention provides an information processing apparatus, an information processing system, an information processing method, and a program for enabling an information processing apparatus to receive a packet transmitted from a server and making it possible to prevent an increase in the traffic of a communication line of the Internet, etc.

An information processing apparatus according to the invention is an information processing apparatus for communicating with a different apparatus through one or more communication processing apparatus, the information processing apparatus including a repetitive packet transmission section for transmitting a repetitive packet of a packet repeatedly transmitted through the one or more communication processing apparatus; a function determination section for determining whether or not the nearest communication processing apparatus has a port mapping setting function; a port mapping setting section for setting port mapping for the nearest communication processing apparatus if the function determination section determines that the nearest communication processing apparatus has a port mapping setting function; and a transmission control section for controlling the repetitive packet transmission section so as to transmit the repetitive packet if the function determination section does not determine that the nearest communication processing apparatus has a port mapping setting function.

According to the configuration, if the communication processing apparatus has the port mapping setting function, a repetitive packet is not transmitted and port mapping is set and if the communication processing apparatus does not have the port mapping setting function, a repetitive packet is transmitted, so that the traffic of the communication line of the Internet, etc., can be decreased as compared with the case where a repetitive packet is transmitted regardless of whether or not the communication processing apparatus has the port mapping setting function.

The information processing apparatus according to the invention may further include a determination section for determining whether or not a transmitted packet can be received through the one or more communication processing apparatus according to the port mapping setting of the port mapping setting section, and if the determination section determines that a transmitted packet can be received, the transmission control section may control the repetitive packet transmission section so as not to transmit the repetitive packet and if the determination section does not determine that a transmitted packet can be received, the transmission control section may control the repetitive packet transmission section so as to transmit the repetitive packet.

According to the configuration, if the port mapping setting made for the communication processing apparatus does not well function (for example, if an error occurs in the port mapping setting or if the information processing apparatus conducts communications through two or more communication processing apparatus), a repetitive packet is transmitted, whereby it is made possible for the information processing apparatus to receive the packet transmitted from a server, etc., through one or more communication processing apparatus.

In the information processing apparatus according to the invention, the determination section may further include a request information transmission section for transmitting request information of information for making a request for transmitting a packet to an assignment port of a port of the nearest communication processing apparatus on the side of a wide area network, assigned by the port mapping; a reception section for receiving a packet transmitted in response to transmission of the requests information; and a reception determination section for determining that the transmitted packet can be received through the one or more communication processing apparatus if the reception section receives the packet.

According to the configuration, whether or not the port mapping setting well functions is determined by whether or not the packet transmitted to the assignment port from a server, etc., can be received, so that whether or not the packet transmitted from a server, etc., can be received according to the port mapping setting can be determined more reliably.

In the information processing apparatus according to the invention, the determination section may determine whether or not the information processing apparatus will conduct communications through two or more communication processing apparatus and if it determines that the information processing apparatus will conduct communications through two or more communication processing apparatus, the determination section may determine that the transmitted packet cannot be received through the one or more communication processing apparatus. According to the configuration, whether or not the port mapping setting well functions can be determined by whether or not the information processing apparatus conducts communications through two or more communication processing apparatus.

In the information processing apparatus according to the invention, the determination section may includes a relay node counting section for counting the number of relay nodes to a global network through the one or more communication processing apparatus; and a communication determination section for determining that communications will be conducted through two or more communication processing apparatus if the number of relay nodes to the global network, counted by the relay node counting section is two or more. According to the configuration, whether or not the port mapping setting well functions can be determined without using a server, etc., for transmitting a packet in response to the request involved in the request information.

In the information processing apparatus according to the invention, the relay node counting section may count the number of relay nodes by executing trace route. According to the configuration, the trace route can be used to determine whether or not the information processing apparatus conducts communications through two or more communication processing apparatus.

An information processing apparatus according to the invention is an information processing apparatus for communicating with a different apparatus through one or more communication processing apparatus, the information processing apparatus including a repetitive packet transmission section for transmitting a repetitive packet of a packet repeatedly transmitted through the one or more communication processing apparatus; a request information transmission section for transmitting request information of information for making a request for transmitting a packet to a predetermined port; a reception section for receiving a packet transmitted in response to transmission of the requests information; a function determination section for determining whether or not the nearest communication processing apparatus has a port mapping setting function; a reception determination section for determining whether or not the reception section receives the packet; and a transmission control section for controlling the repetitive packet transmission section so as not to transmit the repetitive packet if the reception determination section determines that the reception section receives the packet and controlling the repetitive packet transmission section so as to transmit the repetitive packet if the reception determination section does not determine that the reception section receives the packet.

According to the configuration, if the information processing apparatus can receive the packet transmitted to the predetermined port according to the port mapping setting in the communication processing apparatus, transmission of a repetitive packet can be suppressed and the traffic of the communication line of the Internet, etc., can be decreased. On the other hand, if the information processing apparatus can receive the packet transmitted to the predetermined port of the communication processing apparatus, a repetitive packet is transmitted, whereby it is made possible for the information processing apparatus to receive the packet transmitted from the WAN side of one or more communication processing apparatus.

BRIEF DESCRIPTION OF THE DRAWINGS

FIG. 2 is a flowchart to show the operation of an information processing apparatus according to the first embodiment.

FIG. 3 is a flowchart to show the operation of the information processing apparatus according to the first embodiment.

FIG. 4 is a flowchart to show the operation of a server according to the first embodiment.

FIG. 5 is a drawing to show an example of port mapping setting information in the first embodiment.

FIG. 6 is a drawing to describe transmission of request information, etc., in the first embodiment.

FIG. 15 is a drawing to describe an example of the result of the trace route in the second embodiment.

FIG. 21 is a flowchart to show the operation of the information processing apparatus according to the fourth embodiment.

Figure 1:
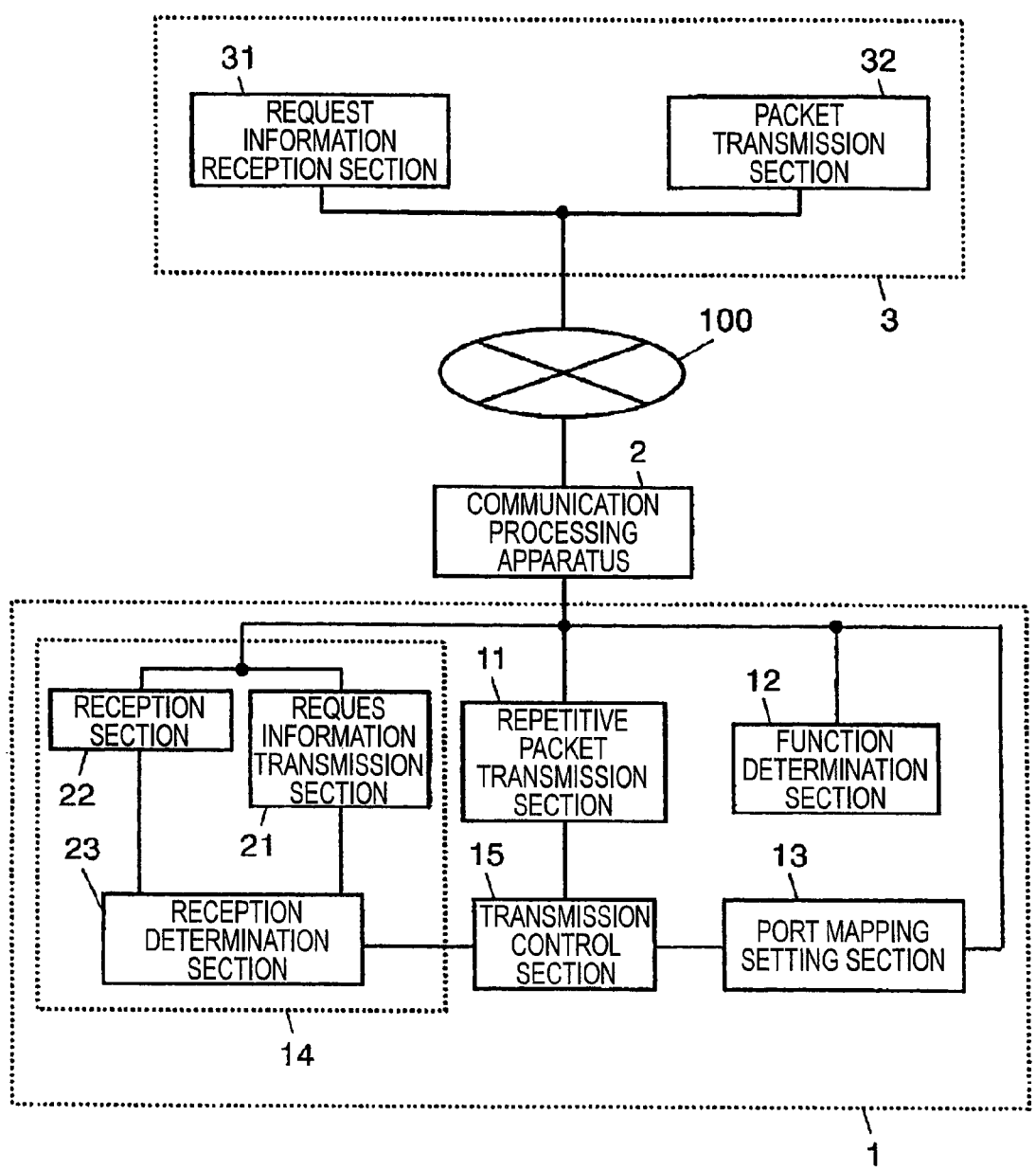
FIG. 1 is a diagram to show the configuration of an information processing system according to a first embodiment of the invention.

DESCRIPTION OF REFERENCE NUMERALS 1, 4, 6, 7 Information processing apparatus
2, 2a, 2b Communication processing apparatus
3, 5 Server
11 Repetitive packet transmission section
12 Function determination section
13 Port mapping setting function
14, 41 Determination section
15 Transmission control section
21 Request information transmission section
22 Reception section
23 Reception determination section
24 Relay node counting section
25 Communication determination section
31 Request information reception section
23 Packet transmission section

BEST MODE FOR CARRYING OUT THE INVENTION

Embodiments of the invention will be discussed with reference to the accompanying drawings.

First Embodiment

An information processing system according to a first embodiment of the invention will be discussed with reference to the accompanying drawings.

FIG. 1 is a block diagram to show the configuration of the information processing system according to the embodiment. In FIG. 1, the information processing system according to the embodiment includes an information processing apparatus 1, a communication processing apparatus 2, and a server 3. The communication processing apparatus 2 and the server 3 are connected by a wired or wireless communication line 100. The communication line 100 is an intranet, the Internet, a public telephone line, etc., for example. In FIG. 1, for convenience of the description, only one information processing apparatus 1 is connected to the communication processing apparatus 2, but two or more information processing apparatus may be connected to the communication processing apparatus 2. FIG. 1 shows the case where the information processing apparatus 1 conducts communications through one communication processing apparatus 2, but the information processing apparatus 1 may conduct communications through two or more communication processing apparatus.

The information processing apparatus 1 includes a repetitive packet transmission section 11, a function determination section 12, a port mapping setting section 13, a determination section 14, and a transmission control section 15. The information processing apparatus 1 is a computer, a microwave oven, a telephone, a printer, a facsimile machine, a refrigerator, a washing machine, an air conditioner, a TV, a video recorder, a set top box, etc., for example.

The repetitive packet transmission section 11 transmits a repetitive packet through the communication processing apparatus 2. The repetitive packet may be transmitted to the server 3, for example, or may be transmitted to any other server. The repetitive packet is a packet repeatedly transmitted by the repetitive packet transmission section 11. The expression "repeatedly transmit" is used to means repeatedly transmitting more than once, and the transmission period may be constant such as five minutes or may be inconstant such as changing in the range of four minutes to five minutes, for example.

The transmission period of the repetitive packet usually is set shorter than the port maintaining time of the communication processing apparatus 2. Payload of the repetitive packet may contain some information or may contain no information. The repetitive packet is a packet of user datagram protocol (UDP) or transmission control protocol (TCP), for example.

The repetitive packet transmission section 11 may include a transmission device such as a modem or a network card, for example, for transmission or may not include a transmission device, in which case a transmission device not shown exists between the repetitive packet transmission section 11 and the communication processing apparatus 2. The repetitive packet transmission section 11 may be implemented as hardware or may be implemented as software such as a driver for driving a transmission device.

The function determination section 12 determines whether or not the nearest communication processing apparatus 2 has a port mapping setting function. The term "nearest" is used to mean that the communication processing apparatus is nearest to the information processing apparatus 1. That is, the communication processing apparatus first receiving a packet transmitted from the information processing apparatus 1 is the nearest communication processing apparatus. If the communication processing apparatus 2 has the port mapping setting function, the information processing apparatus 1 can set port mapping in the communication processing apparatus 2. The port mapping setting is setting for causing the communication processing apparatus 2 to execute processing of relaying a packet transmitted to a port A of the WAN side of the communication processing apparatus 2 to a port B of the information processing apparatus 1.

The port A of the WAN side of the communication processing apparatus 2 assigned by the port mapping setting will be called "assignment port." The port mapping setting function is executed using UPnP, for example. Therefore, the determination as to whether or not the communication processing apparatus 2 has the port mapping setting function may be determination as to whether or not the communication processing apparatus 2 is compatible with UPnP, for example. The determination processing as to whether or not the communication processing apparatus 2 is compatible with UPnP is well known and therefore will not be discussed again here. The function determination section 12 may include a communication device for accessing the communication processing apparatus 2 such as a network card, for example, or may not include a communication device, in which case the function determination section 12 accesses the communication processing apparatus 2 through a communication device not shown.

If the function determination section 12 determines that the nearest communication processing apparatus 2 has the port mapping setting function, the port mapping setting section 13 sets port mapping for the nearest communication processing apparatus 2. The port mapping may be set using UPnP, for example, or may be set by accessing information concerning port mapping setting retained in the communication processing apparatus 2 and adding new port mapping setting to the information; the port mapping may be set using any method. The port mapping setting section 13 may include a communication device such as a network card, for example, for accessing the communication processing apparatus 2 or may not include a communication device, in which case the port mapping setting section 13 accesses the communication processing apparatus 2 through a communication device not shown.

The determination section 14 determines whether or not a packet transmitted from the WAN side of the communication processing apparatus 2 can be received through the communication processing apparatus 2 according to the port mapping setting of the port mapping setting section 13. That is, if port mapping is set by the port mapping setting section 13, the determination section 14 determines whether or not a packet transmitted from the WAN side of the communication processing apparatus 2 to the communication processing apparatus 2 can be received at the information processing apparatus 1 as the port mapping is set. The determination section 14 includes a request information transmission section 21, a reception section 22, and a reception determination section 23.

The request information transmission section 21 transmits request information to the server 3. The request information is information to make a request for transmitting a packet to the assignment port of the port on the WAN side of the nearest communication processing apparatus 2 assigned by port mapping. The request information contains information indicating the port number of the assignment port. The request information may contain or may not contain information indicating the WAN side address of the communication processing apparatus 2 to which the packet is to be transmitted. In the latter case, the server 3 may transmit the packet to the request information transmitting party.

FIG. 1 shows the case where the number of the communication processing apparatus 2 is one. If the information processing apparatus 1 conducts communications through two or more communication processing apparatus, the information indicating the address contained in the request information is information indicating the WAN side address of the communication processing apparatus most distant from the information processing apparatus 1, namely, nearest to the communication line 100 or the server 30. The communication processing apparatus most distant from the information processing apparatus 1 refers to the communication processing apparatus for last receiving the packet transmitted from the information processing apparatus 1 among the communication processing apparatus.

The server 3 may determine that information is request information by the fact that the request information does not contain any request of a command, an instruction, etc., and contains information indicting the port number of the assignment port, for example. The request information transmission section 21 may include a communication device such as a modem or a network card, for example, for conducting communications or may not include a communication device, in which case a communication device not shown exists between the request information transmission section 21 and the communication processing apparatus 2. The request information transmission section 21 may be implemented as hardware or may be implemented as software such as a driver for driving a communication device.

The reception section 22 receives a packet transmitted from the server 3 in response to transmission of the request information. The reception section 22 may include a reception device such as a modem or a network card, for example, for reception or may not include a reception device, in which case a reception device not shown exists between the reception section 22 and the communication processing apparatus 2. The reception section 22 may be implemented as hardware or may be implemented as software such as a driver for driving a reception device.

The reception determination section 23 determines whether or not the reception section 22 receives a packet transmitted from the server 3 to the assignment port. If the reception section 22 receives the packet, the reception determination section determines that the packet transmitted from the server 3 on the WAN side can be received through the communication processing apparatus 2.

If the function determination section 12 determines that the nearest communication processing apparatus 2 does not have the port mapping setting function, the transmission control section 15 controls the repetitive packet transmission section 11 so as to transmit a repetitive packet. That is, if it is determined that the communication processing apparatus 2 does not have the port mapping setting function, when the repetitive packet transmission section 11 does not transmit a repetitive packet, the transmission control section 15 controls the repetitive packet transmission section 11 so as to start transmitting a repetitive packet; when the repetitive packet transmission section 11 transmits a repetitive packet, the transmission control section 15 allows the repetitive packet transmission section 11 to continue transmitting the repetitive packet.

If the reception determination section 23 of the determination section 14 determines that the packet transmitted from the server 3 on the WAN side of the communication processing apparatus 2 can be received, the transmission control section 15 controls the repetitive packet transmission section 11 so as not to transmit a repetitive packet. That is, if the determination section 14 determines that that the transmitted packet can be received, when the repetitive packet transmission section 11 does not transmit a repetitive packet, the transmission control section 15 controls the repetitive packet transmission section 11 so as not to transmit a repetitive packet; when the repetitive packet transmission section 11 transmits a repetitive packet, the transmission control section 15 causes the repetitive packet transmission section 11 to stop transmitting the repetitive packet.

If the reception determination section 23 of the determination section 14 determines that the packet transmitted from the WAN side of the communication processing apparatus 2 cannot be received, the transmission control section 15 controls the repetitive packet transmission section 11 so as to transmit a repetitive packet. That is, if the determination section 14 determines that the transmitted packet cannot be received, when the repetitive packet transmission section 11 does not transmit a repetitive packet, the transmission control section 15 controls the repetitive packet transmission section 11 so as to start transmitting a repetitive packet; when the repetitive packet transmission section 11 transmits a repetitive packet, the transmission control section 15 allows the repetitive packet transmission section 11 to continue transmitting the repetitive packet.

If any two or more elements of the repetitive packet transmission section 11, the function determination section 12, the port mapping setting section 13, the request information transmission section 21, and the reception section 22 have a device involved in communications, they may be the same means or may be different means.

The communication processing apparatus 2 performs processing involved in communications between the information processing apparatus 1 and the server 3. The communication processing apparatus 2 may be an apparatus having a NAT function of performing address translation between a private address and a global address or may have a firewall function of packet filtering or may be an apparatus having both the functions. The packet filtering refers to selecting of a reception packet based on a reception filter rule, for example.

The reception filter rule includes an Address Sensitive filter for receiving a packet only from the packet transmission address from the port, a Port Sensitive filter for receiving a packet only from the packet transmission port from the port, and a No filter meaning that no filter exists, for example. The communication processing apparatus having the port mapping setting function may be a communication processing apparatus having the UPnP function or may be a communication processing apparatus having a function of capable of setting port mapping other than the UPnP function.

The server 3 includes a request information reception section 31 and a packet transmission section 32. The request information reception section 31 receives request information transmitted from the information processing apparatus 1. The request information reception section 31 may include a reception device such as a modem or a network card, for example, for reception or may not include a reception device, in which case a reception device not shown exists between the request information reception section 31 and the communication line 100. The request information reception section 31 may be implemented as hardware or may be implemented as software such as a driver for driving a reception device.

When the request information reception section 31 receives request information, the packet transmission section 32 transmits a packet to the information processing apparatus 1. The expression "transmit a packet to the information processing apparatus 1" also contains the case where the packet destination is set to the address on the WAN side of the communication processing apparatus 2. If the communication processing apparatus 2 has the NAT function, the address of the information processing apparatus 1 cannot be specified as the packet destination, but the address of the communication processing apparatus 2 is specified, whereby address translation is executed in the communication processing apparatus 2 and the packet is transmitted to the information processing apparatus 1.

The packet destination address may be the address of the transmitting party of the request information or may be address indicated by the request information. The port to which the packet is to be transmitted is the assignment port indicated by the request information. If the number of the communication processing apparatus 2 is one as shown in FIG. 1, the packet is transmitted to the communication processing apparatus 2; however, if communications are conducted between the information processing apparatus 1 and the server 3 through two or more communication processing apparatus, the packet is transmitted to the communication processing apparatus nearest to the server 3.

The packet transmission section 32 may include a transmission device such as a modem or a network card, for example, for transmission or may not include a transmission device, in which case a transmission device not shown exists between the packet transmission section 32 and the communication line 100. The packet transmission section 32 may be implemented as hardware or may be implemented as software such as a driver for driving a transmission device. If the request information reception section 31 and the packet transmission section 32 have a device involved in communications, they may be the same means or may be different means.

Next, the operation of the information processing system according to the embodiment will be discussed with flowcharts of FIGS. 2 to 4. The flowchart of FIG. 2 is a flowchart to show the operation of the information processing apparatus 1. The function determination section 12 determines whether or not the communication processing apparatus 2 has the port mapping setting function (step S101). If the communication processing apparatus 2 has the port mapping setting function, the process goes to step 102; otherwise, the process goes to step 104.

The port mapping setting section 13 sets port mapping for the nearest communication processing apparatus 2 (step S102). The determination section 14 determines whether or not the packet transmitted from the WAN side of the communication processing apparatus 2 can be received according to the port mapping setting made at step S102 (step S103). If the packet can be received, the processing is terminated; if the packet cannot be received, the process goes to step S104. The processing is described later in detail.

The transmission control section 15 controls the repetitive packet transmission section 11 so as to start transmitting a repetitive packet (step S104). Then, transmitting a repetitive packet is continued. The processing is terminated. The transmitting of the repetitive packet is terminated with power off of the information processing apparatus 1, control for stopping transmission of the repetitive packet, etc., as a trigger.

FIG. 3 is a flowchart to show the details of the processing at step S103 in the flowchart of FIG. 2. The request information transmission section 21 transmits request information to the effect that a packet is transmitted to the assignment port assigned by the port mapping setting of the port mapping setting section 13 to the server 3 (step 201). The reception determination section 23 determines whether or not the reception section 22 receives a packet transmitted in response to transmission of the request information by the request information transmission section 21 (step S202). If the reception section 22 receives the packet, the process goes to step S204; otherwise, the process goes to step S203.

If the reception section 22 receives the packet transmitted to the information processing apparatus 1 using the port mapping setting, the reception determination section 23 determines that the packet is received. That is, when the port mapping is set so as to relay the packet transmitted to the port A of the communication processing apparatus 2 to the port B of the information processing apparatus 1, if the reception section 22 receives the packet transmitted from the server 3 in any other port than the port B, the reception determination section 23 determines that the reception section 22 receives no packet.

The reception determination section 23 determines whether or not a timeout occurs, namely, whether or not a predetermined time such as 15 seconds, for example, has elapsed since the request information was transmitted (step S203). If a timeout occurs, the process goes to step S205; otherwise, the process returns to step S202. The predetermined time is set to a longer time than the average time from transmission of the request information to reception of the packet responsive to the request indicated in the request information.

The reception determination section 23 determines that the information processing apparatus 1 can receive the packet transmitted to the assignment port (step S204) and goes to "Y" of step S103 in the flowchart of FIG. 2. The reception determination section 23 determines that the information processing apparatus 1 cannot receive the packet transmitted to the assignment port (step S205) and goes to "N" of step S103 in the flowchart of FIG. 2.

FIG. 4 is a flowchart to show the operation of the server 3. The request information reception section 31 determined whether or not request information is received (step S301). If request information is received, the process goes to step S302; otherwise, step S301 is repeated until request information is received. The packet transmission section 32 transmits a packet to the assignment port based on the request information received by the request information reception section 31 (step S302). The process returns to step S301. In the flowchart of FIG. 4, the processing terminates as the power is turned off or a processing termination interrupt occurs.

Next, the operation of the information processing system according to the embodiment will be discussed with a specific example. In the example, it is assumed that the communication processing apparatus 2 is compatible with UPnP. First, when the information processing apparatus 1 is started, the function determination section 12 sends an inquiry about the machine having the UPnP function according to a multicast communication system to the network on the LAN side of the communication processing apparatus 2. Specifically, the function determination section 12 transmits an inquiry packet to IP address "239.255.255.250," port number "1900" as the destination in the network on the LAN side of the communication processing apparatus 2.

As a result, when an answer to the effect that the communication processing apparatus 2 is compatible with UPnP is received from the communication processing apparatus 2, it is sent to the port mapping setting section 13 (step S101). The port mapping setting section 13 accesses the communication processing apparatus 2 using the UPnP function and sets port mapping in the communication processing apparatus 2. Specifically, setting is made so as to make port mapping between the port with port number "25000" (also described as "port 25000") on the WAN side of the communication processing apparatus 2 and port number "23456" (also described as "port 23456") of the information processing apparatus 1 (step S102).

As a result, shown in FIG. 5 is retained. The communication processing apparatus 2 performs processing of transmitting the packet transmitted to the port 25000 on the WAN side of the communication processing apparatus 2 to the port 23456 of the information processing apparatus 1 in accordance with the port mapping setting information. The port 25000 is the assignment port.

FIG. 6 is a drawing to describe processing of transmission of request information and transmission of a packet from the server 3 to the information processing apparatus 1. In FIG. 6, port P1 is the port 23456 and port P2 is the assignment port 25000. The request information transmission section 21 transmits request information containing the port number "25000" of the assignment port 25000 set by the port mapping setting section 13 from port P3 of the information processing apparatus 1 to the server 3 (step S201). The port P3 is a port different from the port P1. Therefore, the request information is transmitted through port P4 to the server 3. The port P4 and the assignment port P2 are generally different ports.

Upon reception of the request information, the request information reception section 31 passes the port number "25000" of the assignment port contained in the request information and IP address "202.132.10.6" of the transmitting party of the request information to the packet transmission section 32 (S301). Then, the packet transmission section 32 transmits a packet to the port number "25000" at the IP address "202.132.10.6" (step S302). The packet is accepted in the communication processing apparatus 2 and is transmitted to the port "23456" (port P1 in FIG. 6) using the port mapping setting information in FIG. 5.

Therefore, the reception section 22 receives the packet and the reception determination section 23 determines that the packet is received (step S202) and determines that the packet transmitted from the server 3 to the assignment port can be received (step S204, S103). Consequently, transmission of repetitive packet is not executed. Then, the information processing apparatus 1 sends the port number "25000" of the assignment port P2 to the server 3 and a server for transmitting information to the information processing apparatus 1 such as a different server, whereby the information processing apparatus 1 can receive information transmitted from the server to the assignment port P2.

If a packet transmitted from the server 3 is received in any other than the port P1, the reception determination section 23 determines that the packet transmitted from the server 3 is not received in the reception section 22, because the packet is not a packet transmitted to the information processing apparatus using the port mapping setting.

The reason why request information is not transmitted from the port P1 in FIG. 6 is as follows: If the port mapping setting in the communication processing apparatus 2 is not appropriately made due to some error, request information is transmitted from the port P1, whereby the request information can be transmitted from the port P2. In this case, the port mapping setting between the ports P1 and P2 is retained in the information processing apparatus 1. This setting is automatically generated in the communication processing apparatus 2 unlike the setting made by the port mapping setting section 13.

The packet transmitted from the server 3 to the port P2 before the expiration of the port maintaining time is transmitted to the port P1. Therefore, it is determined that the packet transmitted to the assignment port can be received in the information processing apparatus 1 and transmission of repetitive packet is not executed, but port mapping between the ports P2 and P1 is not made after the expiration of the port maintaining time since the transmitting time of the packet from the server 3. Since port mapping setting is not made by the port mapping setting section 13, port mapping is not made after the expiration of the port maintaining time since the last communications.

The information processing apparatus 1 cannot receive the packet transmitted from the server 3 to the port P2. To avoid such a situation, the request information is transmitted from the port P3 not used in the port mapping setting. If the request information is transmitted from the port P1, when it is transmitted via any other port than the port P2 to the server 3 or when the probability that the request information may be transmitted via the port P2 is low, the request information may be transmitted from the port P1.

The ports P2 and P4 can become the same port because the port mapping is not appropriately set. In this case, the packet transmitted from the server 3 to the port P2 is received in the port P3 and therefore the reception determination section 23 does not determine that the transmitted packet is received.

Next, the case where the port mapping is not appropriately set like the case where the table setting in FIG. 5 is not made, for example, will be discussed. If the port mapping is not appropriately set, the reception section 22 cannot receive the packet transmitted from the server 3 and a timeout occurs upon expiration of 15 seconds, for example, since transmission of request information (steps S202 and S203). The reception determination section 23 determines that the packet transmitted to the assignment port cannot be received (step S205, S103) and the transmission control section 15 causes the repetitive packet transmission section 11 to start transmitting a repetitive packet (step S104).

Figure 7:
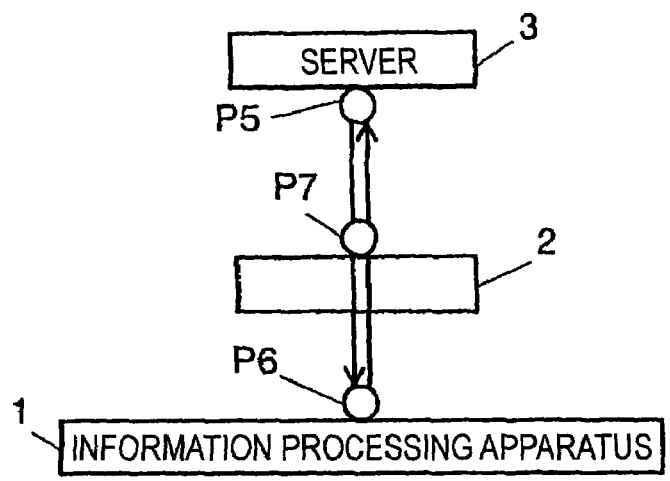
FIG. 7 is a drawing to describe transmission of a repetitive packet, etc., in the first embodiment.

Consequently, a repetitive packet is transmitted repeatedly from the information processing apparatus 1 as shown in FIG. 7. The repetitive packet is transmitted to the server 3 and a server for transmitting information to the information processing apparatus 1 such as a different server. The repetitive packet is transmitted in a shorter period than the port maintaining time of the communication processing apparatus 2, whereby the information processing apparatus 1 can receive information transmitted from the server to port P7 through which the repetitive packet passed. The port P6 may be the same port as the port P1 or P3 in FIG. 6.

Figure 8:
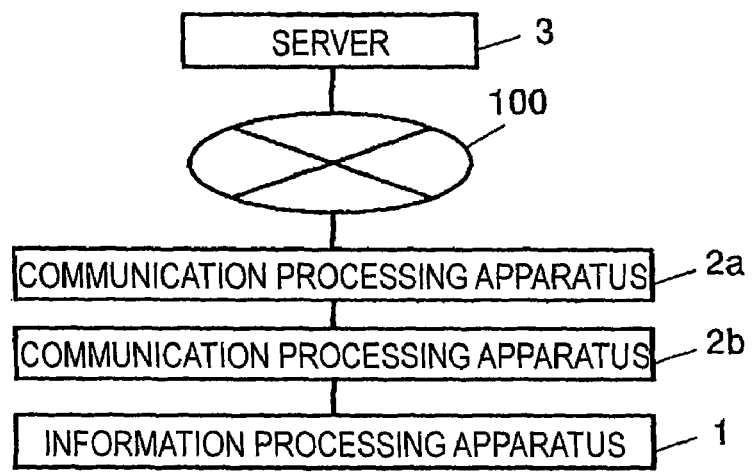
FIG. 8 is a diagram to show the configuration of the information processing system according to the first embodiment.

Next, the case where two or more communication processing apparatus exist as shown in FIG. 8 will be discussed. When two or more communication processing apparatus exist, if port mapping is set in a communication processing apparatus 2b nearest to the information processing apparatus 1, port mapping is not set in a communication processing apparatus 2a and thus the packet transmitted to the port having the same port number as the assignment port of the communication processing apparatus 2a does not arrive at the port of the information processing apparatus 1 specified in the port mapping setting. Therefore, a repetitive packet is transmitted as with the case where the port mapping is not appropriately set (step S104).

Next, the case where the communication processing apparatus 2 does not have the port mapping setting function will be discussed. For example, if the communication processing apparatus 2 does not have the UPnP function, no reply can be received to an inquiry transmitted according to the broadcast communication system by the function determination section 12. Therefore, the function determination section 12 determines that the communication processing apparatus 2 does not have the port mapping setting function (step S101) and the transmission control section 15 causes the repetitive packet transmission section 11 to start transmitting a repetitive packet (step S104).

In the specific example, the case where whether or not the communication processing apparatus 2 has the UPnP function is determined by making an inquiry according to the multicast communication system has been described. However, if the communication processing apparatus 2 can interpret an UPnP command transmitted according to a unicast communication system, whether or not the communication processing apparatus 2 has the UPnP function may be determined by sending an inquiry according to the unicast communication system to the address of the communication processing apparatus 2. Generally, the address of the communication processing apparatus 2 is the address of a gateway of the information processing apparatus 1 and thus the information processing apparatus 1 sends an inquiry according to the unicast communication system to the address of the gateway. Alternatively, whether or not the communication processing apparatus 2 has the UPnP function may be determined by any other method.

As described above, in the information processing system according to the embodiment, whether or not the communication processing apparatus 2 has the port mapping setting function is determined. If the communication processing apparatus 2 does not have the port mapping setting function, a repetitive packet is transmitted; if the communication processing apparatus 2 has the port mapping setting function, port mapping is set. If port mapping is set, whether or not the information processing apparatus 1 can receive the packet transmitted from the WAN side of the communication processing apparatus 2 according to the port mapping setting is determined. When the information processing apparatus 1 can receive the packet, a repetitive packet is not transmitted, whereby the packets transmitted to the communication line 100 can be lessened and the traffic on the communication line 100 can be decreased.

On the other hand, if port mapping is set, the port mapping setting may not well function. For example, if an error occurs in the port mapping setting or if two or more communication processing apparatus exist between the information processing apparatus 1 and the server 3 and port mapping cannot be set for other communication processing apparatus although port mapping can be set appropriately for the communication processing apparatus nearest to the information processing apparatus 1, the port mapping setting does not well function. In such a case, a repetitive packet is transmitted, whereby it is made possible for the information processing apparatus 1 to receive the packet transmitted from the WAN side of the communication processing apparatus 2.

Figure 9:
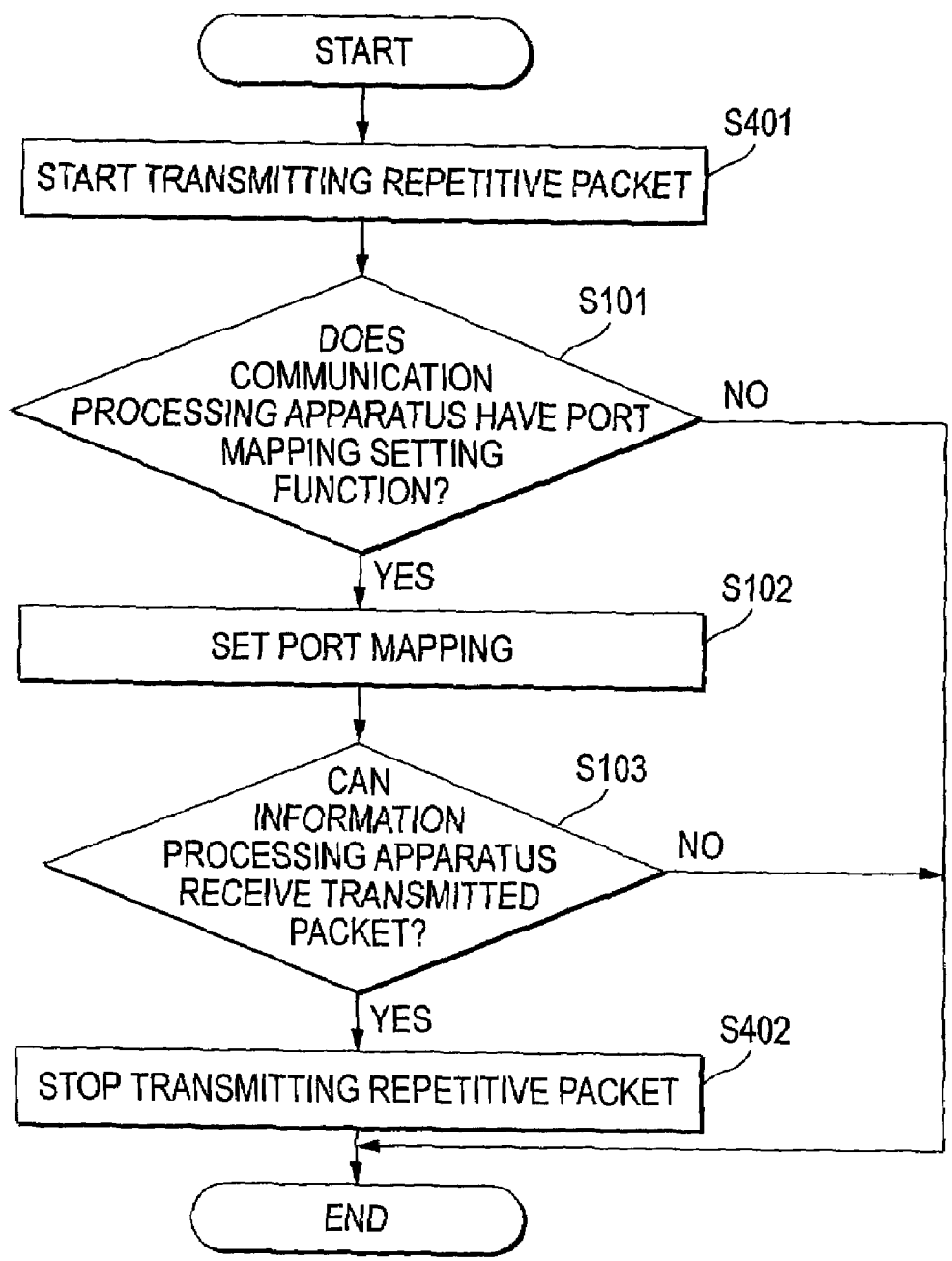
FIG. 9 is a flowchart to show the operation of the information processing system according to the first embodiment.

In the embodiment, the case where the information processing apparatus 1 performs the operation shown in the flowchart of FIG. 2 has been described, but the information processing apparatus 1 may operate as shown in the flowchart of FIG. 9. Steps in FIG. 9 other than step S401 or S402 are similar to those in FIG. 2 and therefore will not be discussed again. The transmission control section 15 causes the repetitive packet transmission section 11 to start transmitting a repetitive packet (step S401). The transmission control section 15 causes the repetitive packet transmission section 11 to stop transmitting the repetitive packet (step S402).

As shown in the flowchart of FIG. 9, the information processing apparatus 1 first transmits a repetitive packet and if it is determined that the information processing apparatus 1 can receive the packet transmitted to the assignment port, the information processing apparatus 1 may stop transmitting the repetitive packet. In this case, any other port than the port on the WAN side of the communication processing apparatus 2 through which the repetitive packet transmitted by the repetitive packet transmission section 11 passes is used as a port on the WAN side of the communication processing apparatus 2.

Therefore, after transmitting the repetitive packet is stopped, the port number on the WAN side of the communication processing apparatus 2 set by the port mapping setting is transmitted to the server for transmitting information to the information processing apparatus 1. Thus, the destination of the information transmitted from the server is changed. The port number on the WAN side of the communication processing apparatus 2 set by the port mapping setting may be transmitted to the server before step S402 or after step S402.

Second Embodiment

An information processing system according to a second embodiment of the invention will be discussed with reference to the accompanying drawings. In the information processing system according to the embodiment, whether or not an information processing apparatus conducts communications through two or more communication processing apparatus is determined and if the information processing apparatus conducts communications through two or more communication processing apparatus, a repetitive packet is transmitted.

Figure 10:
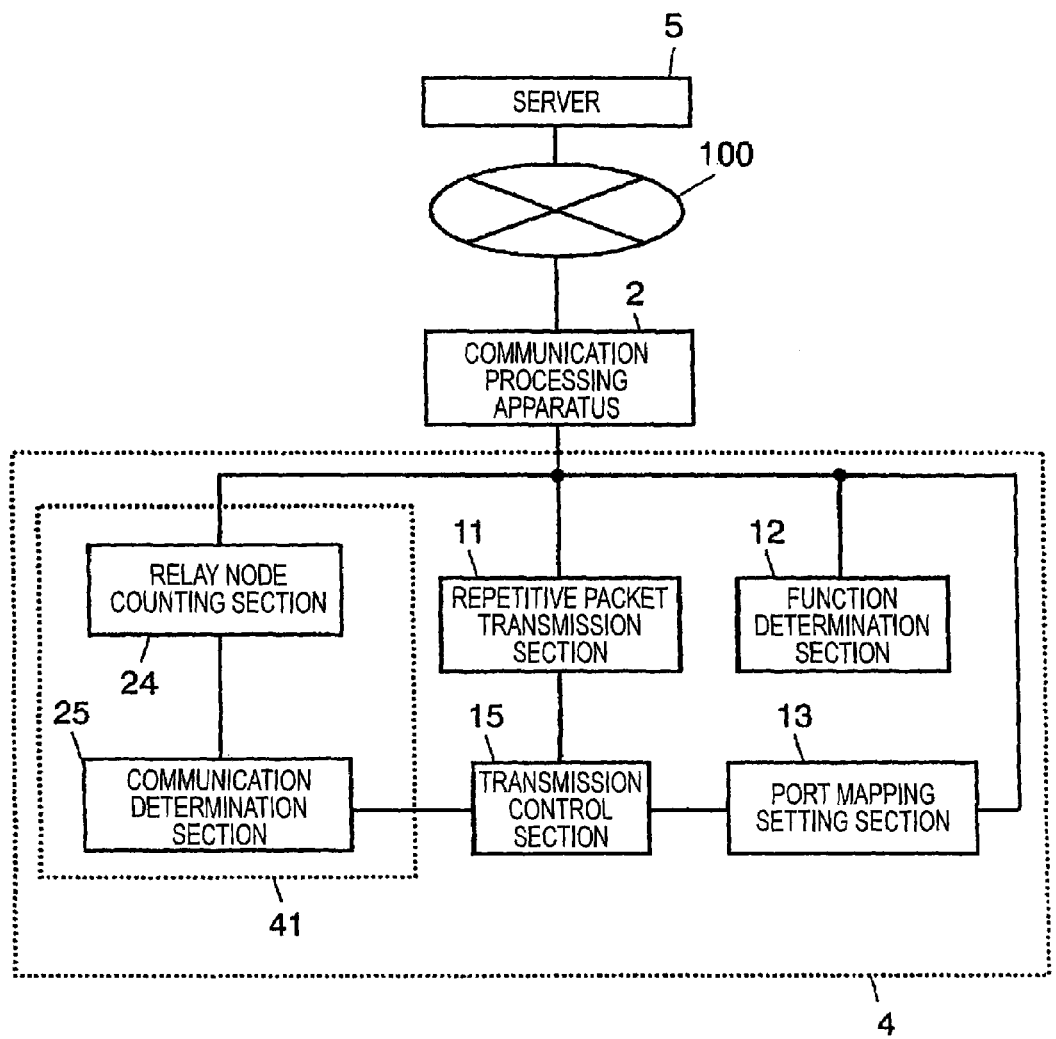
FIG. 10 is a diagram to show the configuration of an information processing system according to a second embodiment of the invention.

FIG. 10 is a diagram to show the configuration of the information processing system according to the embodiment. In FIG. 10, the information processing system according to the embodiment includes an information processing apparatus 4, a communication processing apparatus 2, and a server 5. The information processing system is similar to the information processing system in the first embodiment except that the information processing apparatus 1 becomes the information processing apparatus 4 and that the server 3 becomes the server 5, and will not be discussed again. The information processing apparatus 4 includes a repetitive packet transmission section 11, a function determination section 12, a port mapping setting section 13, a determination section 41, and a transmission control section 15. The components and the operation of the information processing apparatus except the determination section 41 are similar to those of the first embodiment except that the transmission control section 15 controls transmission of a repetitive packet based on the determination result of the determination section 41, and will not be discussed again.

The determination section 41 determines whether or not the information processing apparatus 4 conducts communications through two or more communication processing apparatus and if the determination section 41 determines that the information processing apparatus conducts communications through two or more communication processing apparatus, it determines that the transmitted packet cannot be received through the communication processing apparatus 2. The determination section 41 includes a relay node counting section 24 and a communication determination section 25. The relay node counting section 24 counts the number of relay nodes from the information processing apparatus 4 to a global network. The relay node refers to a device having a routing function of routing a packet, called "router."

The relay node may or may not have a NAT function. That is, the relay node may relay a packet from a global address to a global address or from a private address to a private address without executing address translation or may execute address translation and relay a packet between a private address and a global address. The expression "relay a packet from a global address to a global address" is used to mean that address information contained in the headers of both the packet received by the relay node and the packet transmitted from the relay node (information containing the source address and the destination address) is address information of global addresses.

Likewise, the expression "relay a packet from a private address to a private address" is used to mean that address information contained in the headers of both the packet received by the relay node and the packet transmitted from the relay node is address information of private addresses. On the other hand, the expression "relay a packet between a private address and a global address" is used to mean that address information contained in the header of either of the packet received for relaying and the packet transmitted for relaying contains a private address and address information contained in the header of the other packet is address information of a global address.

The global network is a network made up of relay nodes for relaying a packet from a global address to a global address. To relay a packet, change may or may not be made in information contained in the payload of the packet. The communication processing apparatus 2 is also contained as a relay node. Thus, the relay node counting section 24 counts the number of relay nodes (communication processing apparatus) from the information processing apparatus 4 to the relay node where the LAN side address is a private address and the WAN side address becomes a global address.

Therefore, "relay nodes to the global network" do not contain the relay nodes making up the global network. The number of relay nodes may be counted, for example, according to trace route or by transmitting a UDP packet in which the time to live (TTL) of the packet is set while incrementing the TTL in order stating at 1.

The embodiment assumes that the number of relay nodes is counted according to trace route. Therefore, the expression "count the number of relay nodes from the information processing apparatus 4 to the global network" also contains the operation of counting the number of relay nodes from the information processing apparatus 4 to a predetermined server and finding the number of relay nodes from the information processing apparatus 4 to the global network from the result. The destination of the trace route may be the server 5 or may be another server. The counting processing is described later in detail.

The relay node counting section 24 may or may not include a transmission device such as a modem or a network card, for example, for transmitting a packet at the counting time of the number of relay nodes. The relay node counting section 24 may be implemented as hardware or may be implemented as software such as a driver for driving a transmission device. If the number of relay nodes to the global network counted by the relay node counting section 24 is two or more, the communication determination section 25 determines that communications are conducted through two or more communication processing apparatus. Therefore, in this case, the communication determination section 25 determines that the transmitted packet cannot be received through the communication processing apparatus 2.

If any two or more elements of the repetitive packet transmission section 11, the function determination section 12, the port mapping setting section 13, and the relay node counting section 24 have a device involved in communications, they may be the same means or may be different means. For example, if an external terminal such as a mobile telephone accesses the information processing apparatus 4, the server 5 accepts a packet from the terminal and transmits the packet to the information processing apparatus 4.

Figure 11:
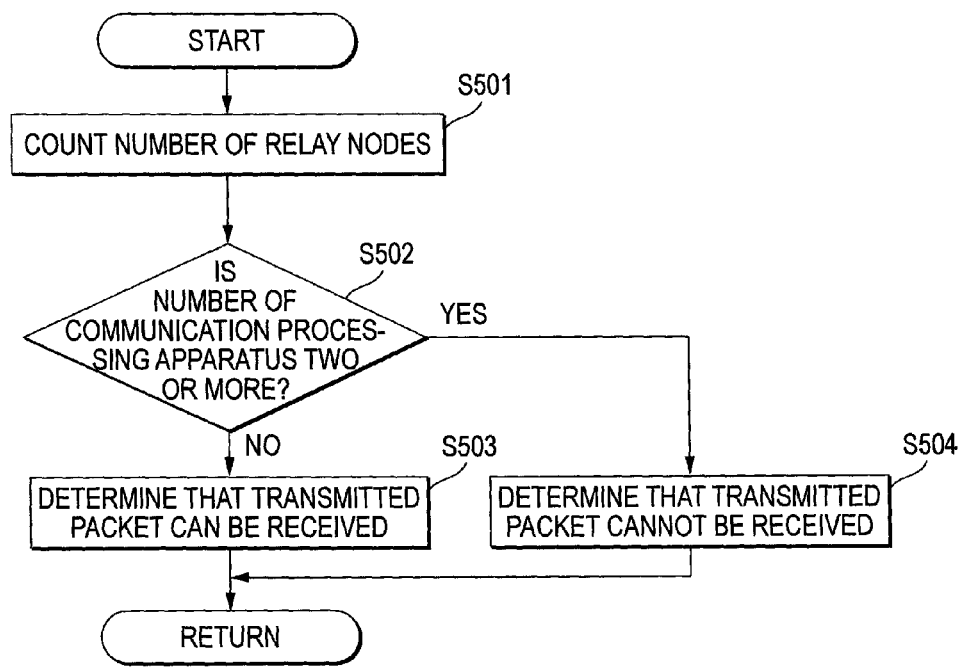
FIG. 11 is a flowchart to show the operation of an information processing apparatus according to the second embodiment.

Next, the operation of the information processing apparatus 4 according to the embodiment will be discussed. The operation of the information processing apparatus 4 according to the embodiment is similar to that in the flowchart of FIG. 2 in the first embodiment. Step S103 in the flowchart of FIG. 2 is executed by the determination section 41 and the processing will be discussed with a flowchart of FIG. 11.

The relay node counting section 24 counts the number of relay nodes from the information processing apparatus 4 to the global network (step S501). The communication determination section 25 determines whether or not communications are conducted through two or more communication processing apparatus as a result of counting at step S501 (S502). If communications are conducted through two or more communication processing apparatus, the process goes to step S504; otherwise, the process goes to step S503.

The communication determination section 25 determines that the packet transmitted to the assignment port can be received in the information processing apparatus 4 (step S503) and goes to "Y" of step S103 in the flowchart of FIG. 2. The communication determination section 25 determines that the information processing apparatus 4 cannot receive the packet transmitted to the assignment port (step S504) and goes to "N" of step S103 in the flowchart of FIG. 2.

Next, a method of counting the number of relay nodes according to trace route by the relay node counting section 24 will be discussed. In the trace route, the route from the apparatus for executing the trace route, here the information processing apparatus 4, to the destination of the trace route, here the server 5, is traced, whereby the IP addresses of the relay nodes to the destination of the trace route can be known.

Figure 12:
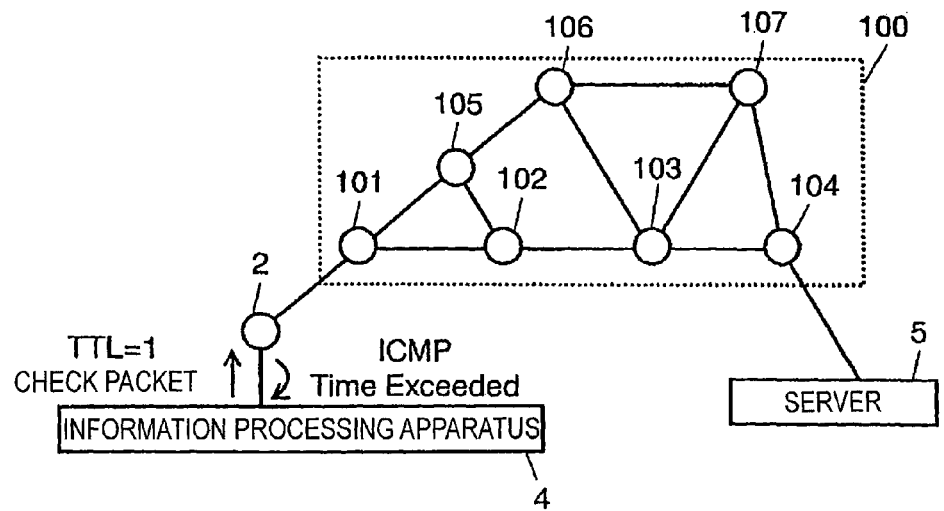
FIG. 12 is a drawing to describe trace route in the second embodiment.
Figures 13, 14:
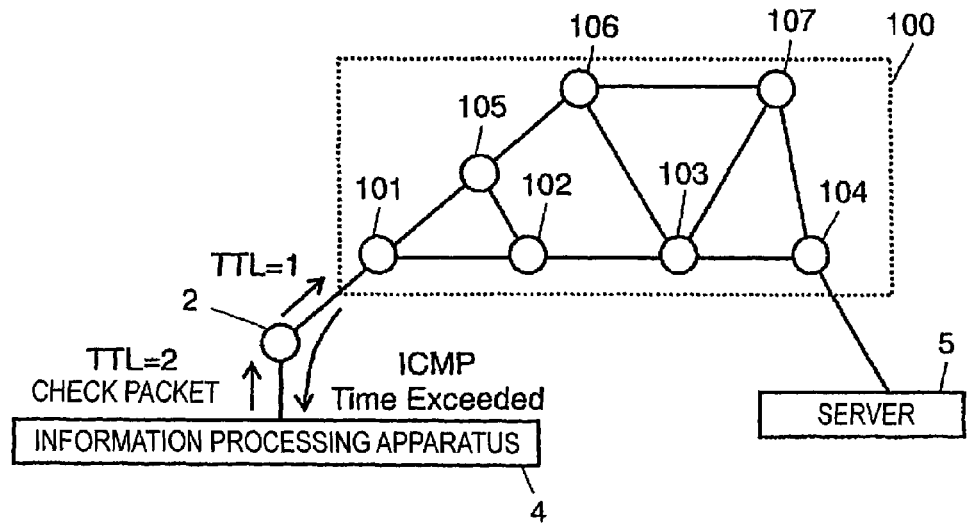
FIG. 13 is a drawing to describe trace route in the second embodiment.
FIG. 14 is a drawing to describe an example of the result of the trace route in the second embodiment.

FIGS. 12 and 13 are drawings to describe the trace route. In FIGS. 12 and 13, each relay node is circled. As shown in FIGS. 10 and 12, first the relay node counting section 24 of the information processing apparatus 4 transmits a check packet with TTL=1 to the server 5. The check packet is a packet transmitted to the destination in the trace route. TTL is set in the check packet.

Since the TTL in the check packet is decremented by one each time a relay node is passed through, when the check packet with TTL=1 arrives at the communication processing apparatus 2, it becomes as TTL=0, and the communication processing apparatus 2 returns information of validity term excess (which will be hereinafter described as Time Exceeded) of Internet control message protocol (ICMP) to the information processing apparatus 4.

Next, as shown in FIG. 13, the relay node counting section 24 transmits a check packet with TTL=2 to the server 5. Then, the check packet becomes as TTL=0 in a relay node 101 and ICMP Time Exceeded is returned from the relay node 101 to the information processing apparatus 4. Accordingly, the relay node counting section 24 can know the IP address of the relay node 101. Thus, transmission of a check packet and reception of ICMP Time Exceeded are repeated while the TTL is incremented by one until the check packet arrives at the server 5, whereby the IP addresses of the relay nodes through which the check packet passed until the check packet arrives at the server 5 can be known.

For a relay node not returning ICMP Time Exceeded, no reply to the transmitted check packet is made. In this case, the relay node counting section 24 transmits another check packet after a timeout occurs. When the check packet arrives at the server 5, ICMP port arrival impossible notification (which will be hereinafter described as Port Unreachable) is returned and the trace route is terminated. ICMP echo response (Echo Reply) rather than ICMP Port Unreachable may be returned in some cases.

The relay node counting section 24 can know the number of the relay nodes through which the packet passed until the packet arrives at the server 5 and the IP addresses of the relay nodes by executing the trace route. The case where the trace route is executed for the server 5 has been described, but the relay node counting section 24 may count the number of the relay nodes by any other method than the trace route and the destination of the check packet may be a server other than the server 5 or the like.

Next, the operation of the information processing system according to the embodiment will be discussed with a specific example. In the example, it is assumed that the communication processing apparatus 2 is compatible with UPnP. Processing until port mapping is set is similar to that in the specific example of the first embodiment and will not be discussed again. The relay node counting section 24 executes trace route for preset IP address "155.32.19.1" of the server 5. It is assumed that the result shown in FIG. 14 is obtained by execution of the trace route.

In FIG. 14, rows are provided in a one-to-one correspondence with relay nodes. Strictly, the last row corresponds to the server 5 rather than a relay node. The information in the rightmost part of each row is the IP address of the relay node on the side of the information processing apparatus 4, namely, on the LAN side. In the trace route, three packets are transmitted to one TTL value. The times to reply of the three packets are contained in each row. The information in the leftmost part of each row is the number of relay nodes from the information processing apparatus 4.

Therefore, from the trace route result shown in FIG. 14, it is seen that the first relay node is not a relay node in the global network because address "192.168.1.1" of the first relay node on the LAN side is a private address. On the other hand, it is seen that the second relay node is a relay node in the global network because address "155.32.10.1" of the second relay node on the LAN side is a global address. Thus, it is seen that the number of the relay nodes to the global network is one (step S501).

Since the number of the relay nodes to the global network is one, the communication determination section 25 determines that the information processing apparatus 4 will conduct communications through one communication processing apparatus 2 (step S503). Therefore, the communication determination section 25 determines that the information processing apparatus 4 can receive a packet transmitted from the WAN side to the assignment port of the communication processing apparatus 2 (step S503). Consequently, a repetitive packet is not transmitted. Then, the information processing apparatus 4 sends the port number of the assignment port to the server 5, whereby it is made possible to receive information transmitted to the assignment port from the server 5.

Next, the case where the information processing apparatus 4 conducts communications through two communication processing apparatus 2a and 2b as in FIG. 8 will be discussed. In this case, the trace route result of the relay node counting section 24 becomes as shown in FIG. 15. Therefore, in this case, it is seen that the number of the relay nodes to the global network is two (step S501). Therefore, the communication determination section 25 determines that the information processing apparatus 4 will conduct communications through two or more communication processing apparatus 2a, 2b and determines that the information processing apparatus 4 cannot receive a packet transmitted to the assignment port (steps S502 and S504). Consequently, a repetitive packet is transmitted (step S104). Processing when the communication processing apparatus 2 does not have the port mapping setting function is similar to that in the specific example of the first embodiment and will not be discussed again.

As described above, in the information processing system according to the embodiment, whether or not the communication processing apparatus 2 has the port mapping setting function is determined. If the communication processing apparatus 2 does not have the port mapping setting function, a repetitive packet is transmitted; if the communication processing apparatus 2 has the port mapping setting function, port mapping is set. If port mapping is set, whether or not the information processing apparatus 4 can receive the packet transmitted from the WAN side of the communication processing apparatus 2 according to the port mapping setting is determined. When the information processing apparatus 4 can receive the packet, a repetitive packet is not transmitted, whereby the packets transmitted to a communication line 100 can be lessened and the traffic on the communication line 100 can be decreased.

On the other hand, if port mapping is set, when the port mapping setting does not well function, a repetitive packet is transmitted, whereby it is made possible for the information processing apparatus 4 to receive the packet transmitted from the WAN side of the communication processing apparatus 2. Further, in the embodiment, whether or not the information processing apparatus 4 can receive the transmitted packet is determined by counting the number of relay nodes, so that there is the advantage that a server for transmitting a packet in response to a request from the information processing apparatus as in the first embodiment is not required.

Also in the embodiment, processing similar to that in FIG. 9 in the first embodiment may be executed. That is, first a repetitive packet is transmitted and if it is determined that the information processing apparatus 4 can receive the packet transmitted to the assignment port, transmitting the repetitive packet may be stopped.

In the embodiment, whether or not the information processing apparatus 4 can receive the packet transmitted to the assignment port is determined by whether or not the information processing apparatus 4 will conduct communications through two or more communication processing apparatus. Therefore, the determination as to whether or not the information processing apparatus 4 can receive the packet transmitted to the assignment port need not be made after the port mapping setting (step S102), and after it is determined at step S103 that the information processing apparatus 4 can receive the packet transmitted to the assignment port, port mapping may be set.

In the embodiment, the case where whether or not the information processing apparatus 4 will conduct communications through two or more communication processing apparatus is determined by counting the number of relay nodes has been described, but may be determined by any other method. A method of determining whether or not the information processing apparatus 4 will conduct communications through two or more communication processing apparatus as any other method than counting the number of relay nodes is, for example, as follows:

The determination section 41 includes a nearest address acquisition section for acquiring the nearest address of the WAN side address of the nearest communication processing apparatus, a most distant address acquisition section for acquiring the most distant address of the WAN side address of the most distant communication processing apparatus, and a communication determination section for determining that communications will be conducted through two or more communication processing apparatus if the nearest address and the most distant address differ. The most distant communication processing apparatus refers to the communication processing apparatus nearest to the global network. The communication processing apparatus does not belong to the global network.

As a method of acquiring the nearest address, for example, the nearest communication processing apparatus has the UPnP function and the nearest address acquisition section acquires the nearest address using the UPnP function. As a method of acquiring the most distant address, for example, a reply request packet for making a request for replying a packet containing the source address of the packet is transmitted through the communication processing apparatus, a reply packet of a packet containing the source address of the reply request packet transmitted in response to the packet reply request is received, and the source address is acquired from the reply packet. The acquired source address becomes the most distant address.

Third Embodiment

An information processing system according to a third embodiment of the invention will be discussed with reference to the accompanying drawings. The information processing system according to the embodiment determines whether or not port mapping set in a communication processing apparatus using a UPnP function or by manual operation of the user is appropriate and if the port mapping is not appropriately set, the information processing system transmits a repetitive packet.

Figure 16:
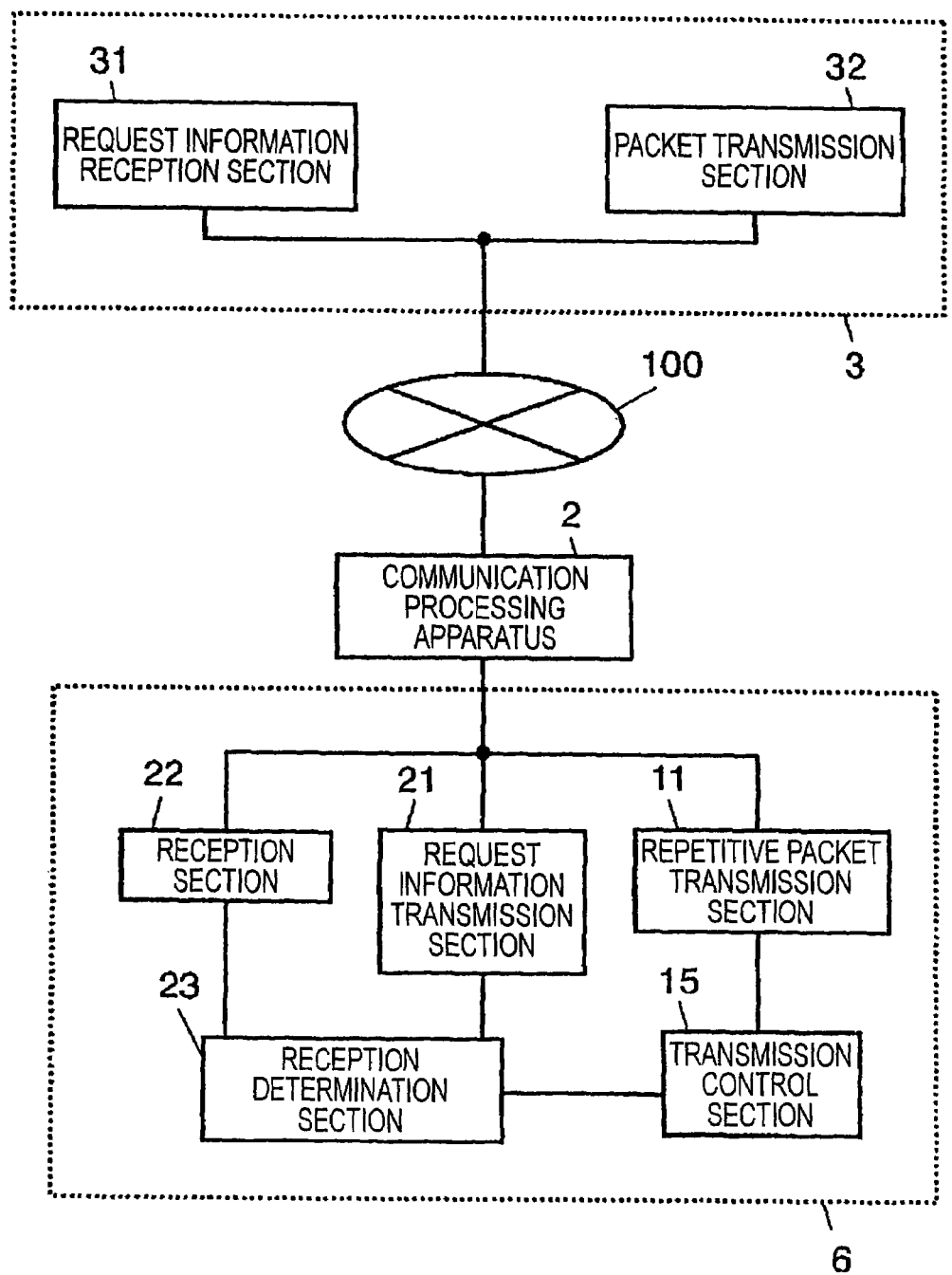
FIG. 16 is a diagram to show the configuration of an information processing system according to a third embodiment of the invention.

FIG. 16 is a diagram to show the configuration of the information processing system according to the embodiment. In FIG. 16, the information processing system according to the embodiment includes an information processing apparatus 6, a communication processing apparatus 2, and a server 3. The information processing system is similar to the information processing system in the first embodiment except that the information processing apparatus 1 becomes the information processing apparatus 6, and will not be discussed again.

The information processing apparatus 6 includes a repetitive packet transmission section 11, a transmission control section 15, a request information transmission section 21, a reception section 22, and a reception determination section 23. The components and the operation of the information processing apparatus are similar to those of the first embodiment except that the function determination section 12 and the port mapping setting section 13 are not included, and will not be discussed again. However, if the reception determination section 23 determines that the reception section 22 receives a packet, the transmission control section 15 controls the repetitive packet transmission section 11 so as not to transmit a repetitive packet and if the reception determination section 23 does not determine that the reception section 22 receives a packet, the transmission control section 15 controls the repetitive packet transmission section 11 so as to transmit a repetitive packet.

Figure 17:
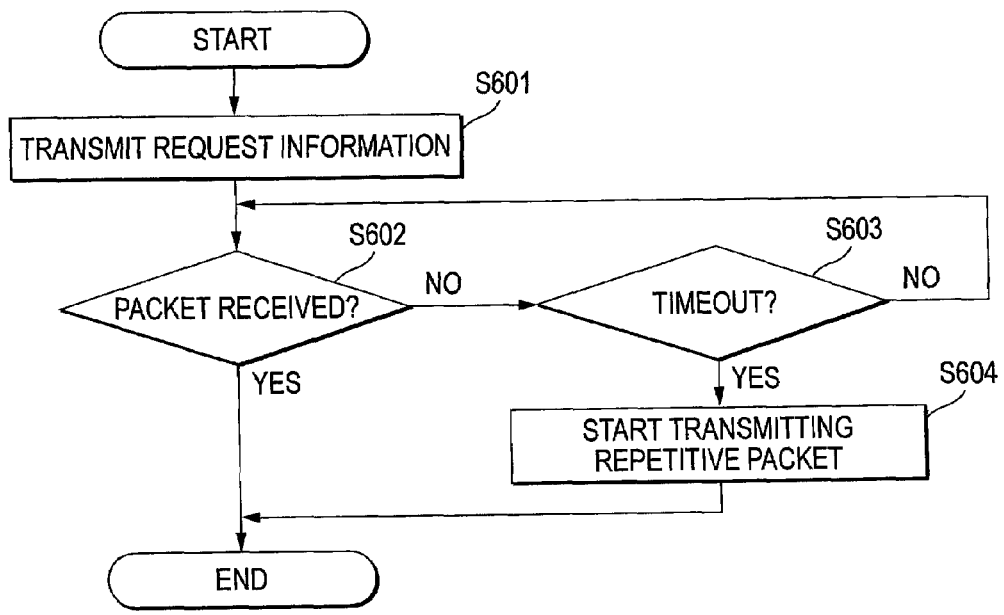
FIG. 17 is a flowchart to show the operation of an information processing apparatus according to the third embodiment.

Next, the operation of the information processing apparatus 6 according to the embodiment will be discussed with a flowchart of FIG. 17. The request information transmission section 21 transmits request information to the effect that a packet is to be transmitted to a predetermined port assigned according to port mapping set in the communication processing apparatus 2 (called "assignment port" also in the embodiment) by the information processing apparatus 6 or by manual setting of the user, etc., to the server 3 (step S601).

The reception determination section 23 determines whether or not the reception section 22 receives a packet transmitted in response to transmission of the request information by the request information transmission section 21 (step S602). If the reception determination section 23 determines that the reception section 22 receives a packet, it determines that the packet transmitted to the assignment port can be received, and the processing is terminated; otherwise, the process goes to step S603.

If the reception section 22 receives the packet transmitted to the information processing apparatus 1 using the port mapping setting, the reception determination section 23 determines that the packet is received. Therefore, if the reception section 22 receives the packet transmitted from the server 3 in any other port than the port of the information processing apparatus 6 specified according to the port mapping setting, the reception determination section 23 determines that the reception section 22 receives no packet.

The reception determination section 23 determines whether or not a timeout occurs, namely, whether or not a predetermined time (for example, 15 seconds, etc.,) has elapsed since the request information was transmitted (step S603). If a timeout occurs, the process goes to step S604; otherwise, the process returns to step S602. The transmission control section 15 controls the repetitive packet transmission section 11 to start transmitting a repetitive packet (step S604). Then, transmitting a repetitive packet is continued. The processing is terminated. The transmitting of the repetitive packet is terminated with power off of the information processing apparatus 6, control for stopping transmission of the repetitive packet, etc., as a trigger.

Next, the operation of the information processing system according to the embodiment will be discussed with a specific example. Processing similar to that of the first embodiment will not be discussed again in detail.

First, the port mapping setting in the communication processing apparatus 2 will be discussed. The port mapping may be set by the information processing apparatus 6 or any other apparatus connected to the LAN side of the communication processing apparatus 2 as in the specific example of the first embodiment or may be set as the user logs in to the communication processing apparatus 2 by using a PC, etc., connected to the LAN side of the communication processing apparatus 2 and manually sets the port mapping in the communication processing apparatus 2. It is assumed that the port mapping is predetermined so that it is set as shown in FIG. 5 as in the specific example of the first embodiment.

The request information transmission section 21 transmits request information containing port number "25000" of assignment port 25000 from the information processing apparatus 1 to the server 3 (step S601). The packet transmitted from the server 3 in response to the request involved in the request information is accepted in the communication processing apparatus 2 and is transmitted to port "23456" using the port mapping setting information in FIG. 5.

Therefore, the reception determination section 23 determines that the reception section 22 receives the packet (step S602). Consequently, transmission of a repetitive packet is not executed. Then, the information processing apparatus 6 sends the port number "25000" of the assignment port to the server 3 and a server for transmitting information to the information processing apparatus 6 such as a different server, whereby the information processing apparatus 6 can receive information transmitted from the server to the assignment port.

Next, the case where the port mapping is not appropriately set or the case where the information processing apparatus 6 conducts communications through two or more communication processing apparatus as in FIG. 8 will be discussed. In these cases, the reception section 22 cannot receive the packet transmitted from the server 3 and a timeout occurs upon expiration of 15 seconds since transmission of request information (step S603). The reception determination section 23 determines that the packet transmitted to the assignment port cannot be received and the transmission control section 15 causes the repetitive packet transmission section 11 to start transmitting a repetitive packet (step S604). Consequently, a repetitive packet is transmitted repeatedly from the information processing apparatus 6.

In the embodiment, if the user sets appropriate port mapping for two or more communication processing apparatus, the reception section 22 can receive the packet transmitted from the server 3 and a repetitive packet is not transmitted. The expression "set appropriate port mapping" is used to mean that if communications are conducted through two communication processing apparatus 2a and 2b as in FIG. 8, for example, the information processing apparatus 6 can receive the packet transmitted from the server 3 according to the port mapping setting.

Specifically, if setting is made so that access to the information processing apparatus 6 from a terminal through the server 3 is conducted to the port number "25000," the user logs in to the communication processing apparatus 2a and 2b by operating a PC, etc., whereby the user sets the port mapping in the communication processing apparatus 2a to transmit the packet transmitted to the WAN side port "25000" of the communication processing apparatus 2a to WAN side port "20000" of the communication processing apparatus 2b and sets the port mapping in the communication processing apparatus 2b to transmit the packet transmitted to the WAN side port "20000" of the communication processing apparatus 2b to WAN side port "23456" of the information processing apparatus 6. In this case, the information processing apparatus 6 can receive the packet transmitted from the server 3 to the port "25000" of the communication processing apparatus 2a.

As described above, according to the information processing system according to the embodiment, if the information processing apparatus 6 can receive the packet transmitted to the assignment port according to the port mapping setting in the communication processing apparatus 2, transmission of a repetitive packet can be suppressed and the traffic on a communication line 100 can be decreased. On the other hand, if the information processing apparatus 6 cannot receive the packet transmitted to the assignment port according to the port mapping setting in the communication processing apparatus 2 or port mapping setting in the communication processing apparatus 2 is not made, etc., a repetitive packet is transmitted, whereby it is made possible for the information processing apparatus 6 to receive the packet transmitted from the WAN side of the communication processing apparatus 2.

Figure 18:
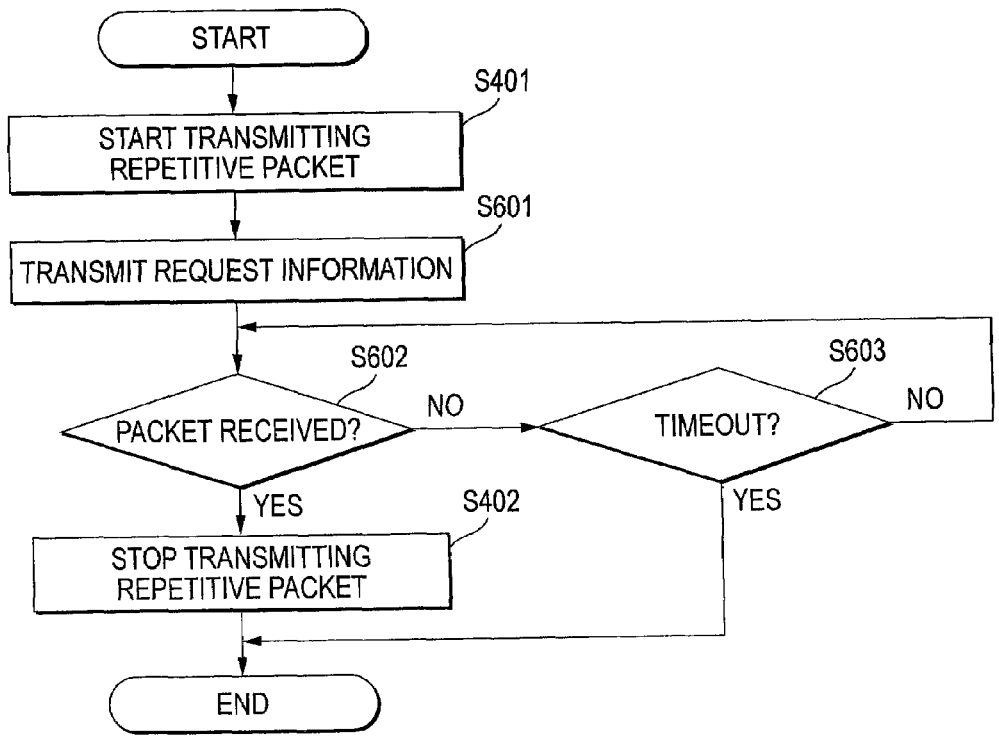
FIG. 18 is a flowchart to show the operation of the information processing apparatus according to the third embodiment.

Also in the embodiment, as shown in FIG. 18, after transmission of a repetitive packet is started, whether or not the information processing apparatus 6 can receive the packet transmitted to the assignment port may be determined and if the information processing apparatus 6 can receive the packet, transmitting the repetitive packet may be stopped; if the information processing apparatus 6 cannot receive the packet, transmitting the repetitive packet may be continued.

Fourth Embodiment

Figure 19:
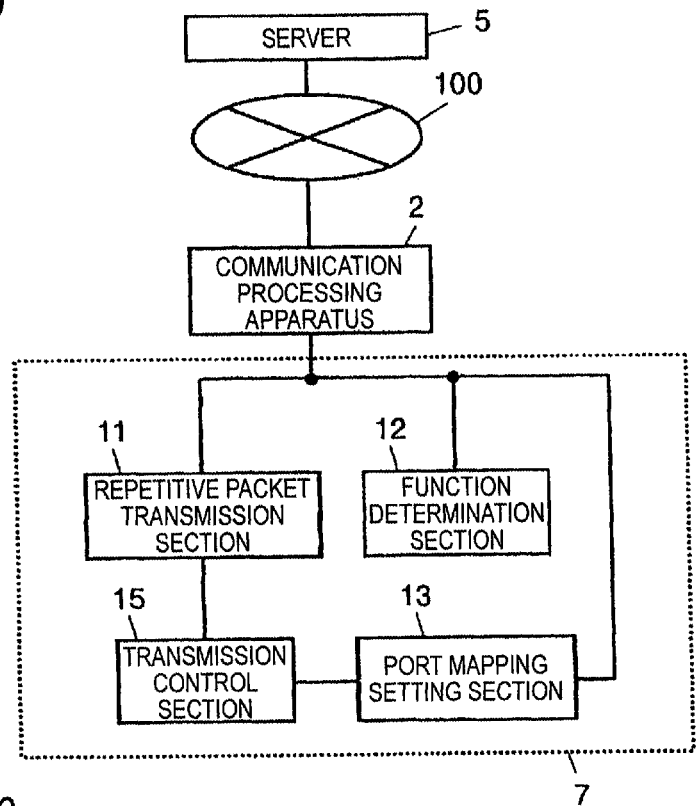
FIG. 19 is a diagram to show the configuration of an information processing system according to a fourth embodiment of the invention.

An information processing system according to a fourth embodiment of the invention will be discussed with reference to the accompanying drawings. If a communication processing apparatus has a port mapping setting function, the information processing system according to the embodiment sets port mapping and does not transmit a repetitive packet; if a communication processing apparatus does not have a port mapping setting function, the information processing system transmits a repetitive packet FIG. 19 is a diagram to show the configuration of the information processing system according to the embodiment. In FIG. 19, the information processing system according to the embodiment includes an information processing apparatus 7, a communication processing apparatus 2, and a server 5. The information processing system is similar to the information processing system in the first embodiment except that the information processing apparatus 1 becomes the information processing apparatus 7 and that the server 3 becomes the server 5, and will not be discussed again.

The information processing apparatus 7 includes a repetitive packet transmission section 11, a function determination section 12, a port mapping setting section 13, and a transmission control section 15. The components and the operation of the information processing apparatus are similar to those of the first embodiment and will not be discussed again. However, the transmission control section 15 does not use the determination result of a determination section 14 and controls the repetitive packet transmission section 11 so as to transmit a repetitive packet if the function determination section 12 determines that the nearest communication processing apparatus 2 does not have the port mapping setting function. The server 5 is similar to the server 5 of the second embodiment and will not be discussed again.

Figure 20:
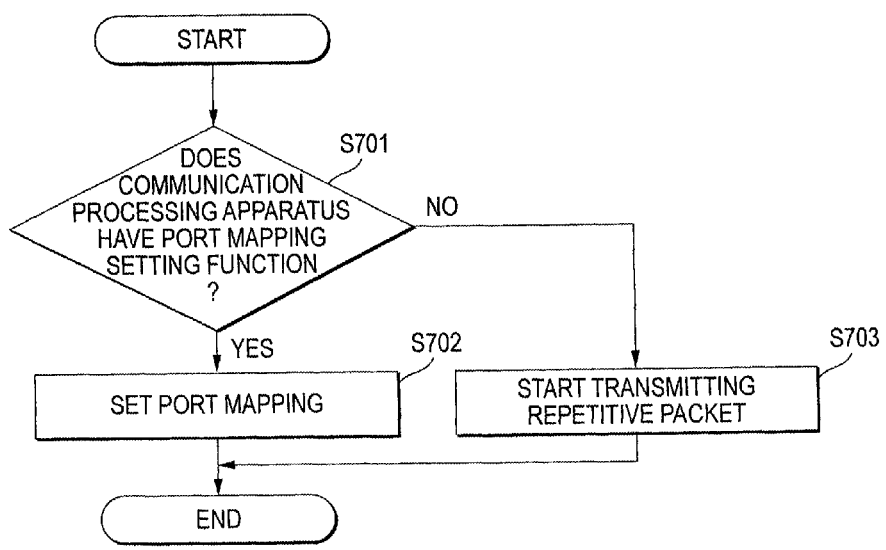
FIG. 20 is a flowchart to show the operation of an information processing apparatus according to the fourth embodiment.

Next, the operation of the information processing apparatus 7 according to the embodiment will be discussed with a flowchart of FIG. 20. The function determination section 12 determines whether or not the communication processing apparatus 2 has the port mapping setting function (step S701). If the communication processing apparatus 2 has the port mapping setting function, the process goes to step S702; otherwise, the process goes to step S703. The port mapping setting section 13 sets port mapping for the communication processing apparatus 2 (step S702). The processing is terminated.

The transmission control section 15 controls the repetitive packet transmission section 11 to start transmitting a repetitive packet (step S703). Then, transmitting a repetitive packet is continued. The processing is terminated. The transmitting of the repetitive packet is terminated with power off of the information processing apparatus 7, control for stopping transmission of the repetitive packet, etc., as a trigger. A specific example of the information processing system according to the embodiment is similar to the specific example of the first embodiment except that processing involved in step S103 is not performed, and will not be discussed again.

As described above, according to the information processing system according to the embodiment, if the communication processing apparatus 2 has the port mapping setting function, port mapping is set without transmitting a repetitive packet and if the communication processing apparatus 2 does not have the port mapping setting function, a repetitive packet is transmitted, so that the traffic on a communication line 100 can be decreased as compared with the case where a repetitive packet is transmitted regardless of whether or not the communication processing apparatus 2 has the port mapping setting function.

Also in the embodiment, as shown in FIG. 21, after transmission of a repetitive packet is started, whether or not the communication processing apparatus 2 has the port mapping setting function may be determined and if the communication processing apparatus 2 has the port mapping setting function, transmitting the repetitive packet may be stopped; if the communication processing apparatus 2 does not have the port mapping setting function, transmitting the repetitive packet may be continued.

In the embodiments described above, the case where the server is identified by the IP address has been described, but the server may be identified by a domain name such as "server.pana.net." In this case, the domain name is converted into an IP address using a domain name system (DNS) server, whereby the server can be identified.

The communication protocol in the embodiments described above may be IP version 4 (Internet Protocol version 4: IPv4) or may be IP version 6 (Internet Protocol version 6: IPv6). In the embodiments described above, each processing (each function) may be implemented as it is executed as centralized processing by a single apparatus (system) or may be implemented as it is executed as distributed processing by a plurality of apparatus.

In the embodiments described above, the components may be implemented as dedicated hardware or the components that can be implemented as software may be implemented as a program is executed. For example, a program execution section such as a central processing unit (CPU) reads and executes a software program recorded on a record medium of a hard disk, semiconductor memory, etc., whereby the components can be implemented.

Software for implementing the information processing apparatus in each of the embodiments described above is the following program: The program is a program for causing a computer to execute processing in an information processing apparatus for conducting communications through one or more communication processing apparatus, the program for causing the computer to execute a function determination step of determining whether or not the nearest communication processing apparatus has a port mapping setting function; a port mapping setting step of setting port mapping for the nearest communication processing apparatus if it is determined in the function determination step that the nearest communication processing apparatus has a port mapping setting function; and a repetitive packet transmission step of transmitting a repetitive packet of a packet repeatedly transmitted through the one or more communication processing apparatus if it is not determined in the function determination step that the nearest communication processing apparatus has a port mapping setting function.

The program may cause the computer to further execute a determination step of determining whether or not a transmitted packet can be received through the one or more communication processing apparatus according to the port mapping setting in the port mapping setting step, wherein if it is determined in the determination step that a transmitted packet can be received, the repetitive packet may not be transmitted in the repetitive packet transmission step and if it is not determined in the determination step that a transmitted packet can be received, the repetitive packet may be transmitted in the repetitive packet transmission step.

Another program is a program for causing a computer to execute processing in an information processing apparatus for conducting communications through one or more communication processing apparatus, the program for causing the computer to execute a request information transmission step of transmitting request information of information for making a request for transmitting a packet to a predetermined port; a reception determination step of determining whether or not a packet transmitted in response to transmission of the requests information is received; and a repetitive packet transmission step of not transmitting a repetitive packet of a packet repeatedly transmitted through the one or more communication processing apparatus if it is determined in the reception determination step that the packet is received and transmitting the repetitive packet if it is not determined in the reception determination step that the packet is received.

In the above-described program, in the transmitting step of transmitting information, the setting step, etc., processing performed by hardware, for example, processing performed with a modem, an interface card, etc., in the transmitting step (processing performed only in hardware) is not included. The program may be executed as it is downloaded from a server, etc., or may be executed as a program recorded on a predetermined record medium (for example, an optical disk such as a CD-ROM, a magnetic disk, semiconductor memory, etc.,) is read.

A single or two or more computers may execute the program. That is, centralized processing may be performed or distributed processing may be performed. The invention is not limited to the specific embodiments described above and various changes can be made and are also included in the scope of the invention.

INDUSTRIAL APPLICABILITY

As described above, if the communication processing apparatus has the port mapping setting function, etc., the information processing apparatus, etc., according to the invention does not repeatedly transmit a packet, so that an increase in the traffic of the communication line of the Internet, etc., can be prevented, and the information processing apparatus, etc., is useful as an information processing apparatus, etc., for receiving information transmitted from a server through a communication processing apparatus.

The invention claimed is:

1. An information processing apparatus for communicating with a different apparatus through one or more communication processing apparatus, said information processing apparatus comprising:
   a repetitive packet transmission section for transmitting a repetitive packet of a packet repeatedly transmitted through the one or more communication processing apparatus;
   a function determination section for determining whether or not a nearest of the one or more communication processing apparatus has a port mapping setting function;
   a port mapping setting section for setting port mapping for the nearest of the one or more communication processing apparatus if said function determination section determines that the nearest of the one or more communication processing apparatus has a port mapping setting function; and
   a transmission control section for controlling said repetitive packet transmission section so as to: (i) transmit the repetitive packet in a shorter period than a port maintaining time of the one or more communication processing apparatus if said function determination section does not determine that the nearest of the one or more communication processing apparatus has a port mapping setting function, and (ii) not transmit the repetitive packet if said function determination section determines that the nearest of the one or more communication processing apparatus has a port mapping setting function.

2. The information processing apparatus as claimed in claim 1, further comprising:
   a determination section for determining whether or not a transmitted packet can be received through the one or more communication processing apparatus according to the port mapping setting of said port mapping setting section,
   wherein if the determination section determines that a transmitted packet can be received, said transmission control section controls said repetitive packet transmission section so as not to transmit the repetitive packet and if the determination section does not determine that a transmitted packet can be received, said transmission control section controls said repetitive packet transmission section so as to transmit the repetitive packet.

3. The information processing apparatus as claimed in claim 2 wherein the determination section comprises:
   a request information transmission section for transmitting request information of information for making a request for transmitting a packet to an assignment port of a port of the nearest of the one or more communication processing apparatus on the side of a wide area network, assigned by the port mapping;
   a reception section for receiving a packet transmitted in response to transmission of the request information; and
   a reception determination section for determining that the transmitted packet can be received through the one or more communication processing apparatus if the reception section receives the packet.

4. The information processing apparatus as claimed in claim 2 wherein the determination section determines whether or not said information processing apparatus will conduct communications through two or more communication processing apparatus and if it determines that said information processing apparatus will conduct communications through two or more communication processing apparatus, the determination section does not determine that the transmitted packet can be received through the one or more communication processing apparatus.

5. The information processing apparatus as claimed in claim 4 wherein the determination section comprises:
   a relay node counting section for counting the number of relay nodes to a global network through the one or more communication processing apparatus; and
   a communication determination section for determining that communications will be conducted through two or more communication processing apparatus if the number of relay nodes to the global network, counted by the relay node counting section is two or more.

6. The information processing apparatus as claimed in claim 5 wherein the relay node counting section counts the number of relay nodes by executing trace route.

7. The information processing apparatus as claimed in claim 1 wherein the communication processing apparatus having the port mapping setting function is a communication processing apparatus having a universal plug and play function.

8. The information processing apparatus as claimed in claim 1 wherein said repetitive packet transmission section transmits a repetitive packet of a user datagram protocol.

9. An information processing apparatus for communicating with a different apparatus through one or more communication processing apparatus, said information processing apparatus comprising:
   a repetitive packet transmission section for transmitting a repetitive packet of a packet repeatedly transmitted through the one or more communication processing apparatus;
   a request information transmission section for transmitting request information of information for making a request for transmitting a packet to a predetermined port;
   a reception section for receiving a packet transmitted in response to transmission of the request information;
   a function determination section for determining whether or not a nearest of the one or more communication processing apparatus has a port mapping setting function;
   a reception determination section for determining whether or not the reception section receives the packet; and a transmission control section for controlling said repetitive packet transmission section so as not to transmit the repetitive packet if said reception determination section determines that the reception section receives the packet and controlling said repetitive packet transmission section so as to transmit the repetitive packet if said reception determination section does not determine that the reception section receives the packet.

10. The information processing apparatus as claimed in claim 9 wherein said repetitive packet transmission section transmits a repetitive packet of a user datagram protocol.

11. An information processing system comprising an information processing apparatus as claimed in claim 3 and a server, wherein said server comprises:
   a request information reception section for receiving the request information; and
   a packet transmission section for transmitting a packet to the assignment port if the request information reception section receives the request information.

12. An information processing system comprising an information processing apparatus as claimed in claim 9 and a server, wherein said server comprises:
   a request information reception section for receiving the request information; and
   a packet transmission section for transmitting a packet to the predetermined port if the request information reception section receives the request information.

13. An information processing method for communicating with a different apparatus through one or more communication processing apparatus, said information processing method comprising:
   a function determination step of determining whether or not a nearest of the one or more communication processing apparatus has a port mapping setting function;
   a port mapping setting step of setting port mapping for the nearest of the one or more communication processing apparatus if it is determined in said function determination step that the nearest of the one or more communication processing apparatus has a port mapping setting function; and
   a repetitive packet transmission step of (i) transmitting a repetitive packet of a packet repeatedly transmitted through the one or more communication processing apparatus in a shorter period than a port maintaining time of the one or more communication processing apparatus if it is not determined in said function determination step that the nearest of the one or more communication processing apparatus has a port mapping setting function, and (ii) not transmitting the repetitive packet if said function determination section determines that the nearest of the one or more communication processing apparatus has a port mapping setting function.

14. The information processing method as claimed in claim 13 further comprising:

a determination step of determining whether or not a transmitted packet can be received through the one or more communication processing apparatus according to the port mapping setting in said port mapping setting step,
   wherein if it is determined in said determination step that a transmitted packet can be received, the repetitive packet is not transmitted in said repetitive packet transmission step and if it is not determined in said determination step that a transmitted packet can be received, the repetitive packet is transmitted in said repetitive packet transmission step.

15. A non-transitory computer readable medium having a program of instructions stored on the medium, the program for causing a computer to execute processing in an information processing apparatus for conducting communications through one or more communication processing apparatus, said program for causing the computer to execute:
   a function determination step of determining whether or not a nearest of the one or more communication processing apparatus has a port mapping setting function;
   a port mapping setting step of setting port mapping for the nearest of the one or more communication processing apparatus if it is determined in said function determination step that the nearest of the one or more communication processing apparatus has a port mapping setting function; and
   a repetitive packet transmission step of (i) transmitting a repetitive packet of a packet repeatedly transmitted through the one or more communication processing apparatus in a shorter period than a port maintaining time of the one or more communication processing apparatus if it is not determined in said function determination step that the nearest of the one or more communication processing apparatus has a port mapping setting function, and (ii) not transmitting the repetitive packet if said function determination section determines that the nearest of the one or more communication processing apparatus has a port mapping setting function.

16. The non-transitory computer readable medium having the program of instructions stored thereon of claim 15 for causing the computer to further execute a determination step of determining whether or not a transmitted packet can be received through the one or more communication processing apparatus according to the port mapping setting in said port mapping setting step,
   Wherein if it is determined in the determination step that a transmitted packet can be received, the repetitive packet is not transmitted in said repetitive packet transmission step and if it is not determined in said determination step that a transmitted packet can be received, the repetitive packet is transmitted in a shorter period than a port maintaining time of the one or more communication processing apparatus in said repetitive packet transmission step.

* * * * *